US009330479B2

(12) United States Patent
Suzuki

(10) Patent No.: US 9,330,479 B2
(45) Date of Patent: May 3, 2016

(54) DISPLAY SYSTEM, DISPLAY APPARATUS, AND METHOD FOR CONTROLLING DISPLAY SYSTEM FOR DISPLAYING ONE IMAGE BY COMBINING TWO IMAGES

(71) Applicant: CANON KABUSHIKI KAISHA, Tokyo (JP)

(72) Inventor: Motohiro Suzuki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 508 days.

(21) Appl. No.: 13/768,434

(22) Filed: Feb. 15, 2013

(65) Prior Publication Data
US 2013/0215138 A1 Aug. 22, 2013

(30) Foreign Application Priority Data
Feb. 21, 2012 (JP) ................................. 2012-035074

(51) Int. Cl.
*G03B 21/26* (2006.01)
*G06T 11/00* (2006.01)
*G06F 3/14* (2006.01)
*G09G 3/00* (2006.01)

(52) U.S. Cl.
CPC ............ *G06T 11/001* (2013.01); *G06F 3/1438* (2013.01); *G09G 3/002* (2013.01); *G03B 21/26* (2013.01); *G09G 2320/0606* (2013.01); *G09G 2320/066* (2013.01); *G09G 2320/0613* (2013.01); *G09G 2320/0626* (2013.01); *G09G 2320/0693* (2013.01); *G09G 2340/0407* (2013.01); *G09G 2340/0464* (2013.01); *G09G 2340/14* (2013.01); *G09G 2354/00* (2013.01); *G09G 2356/00* (2013.01); *G09G 2370/12* (2013.01)

(58) Field of Classification Search
CPC ................... G03B 21/26; G03B 37/04; G09G 2320/0233; G09G 2320/0693; G09G 1/13336; G06T 11/005; G06T 11/00; H04N 9/31
See application file for complete search history.

(56) References Cited

U.S. PATENT DOCUMENTS

2005/0207046 A1* 9/2005 Tamura ......................... 359/891
2007/0273837 A1* 11/2007 Furui ............................. 353/31

FOREIGN PATENT DOCUMENTS

| CN | 101720046 A | 6/2010 |
| CN | 102244757 A | 11/2011 |
| JP | 10-090645 | 4/1998 |

OTHER PUBLICATIONS

Sep. 16, 2015 Chinese Office Action, with an English Translation, that issued in Chinese Patent Application No. 201310055779.2.

*Primary Examiner* — Sultan Chowdhury
*Assistant Examiner* — Danell L Owens
(74) *Attorney, Agent, or Firm* — Cowan, Liebowitz & Latman, P.C.

(57) ABSTRACT

A display system for displaying one image on a display surface by combining a first image displayed by a first display apparatus and a second image displayed by a second display apparatus, wherein: the first display apparatus displays a first index image at a position which is close to the image displayed by the second display apparatus and which is included in a display range of the first display apparatus, the first index image having a predetermined color and the image having luminances which are changed in a direction parallel to a side adjacent to the image displayed by the second display apparatus; and the first display apparatus corrects the image displayed by the first display apparatus on the basis of a designated position of the first index image.

14 Claims, 34 Drawing Sheets

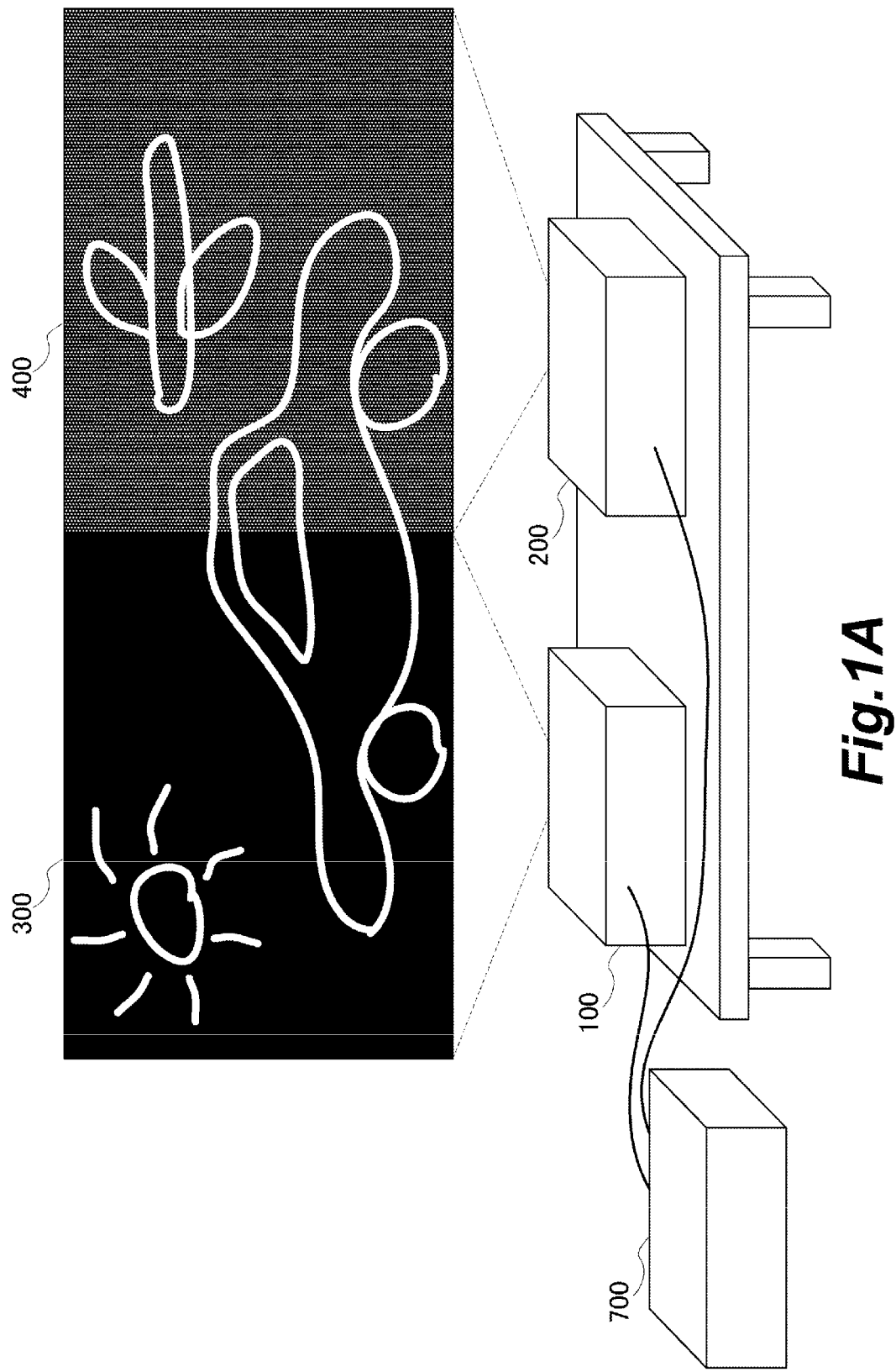

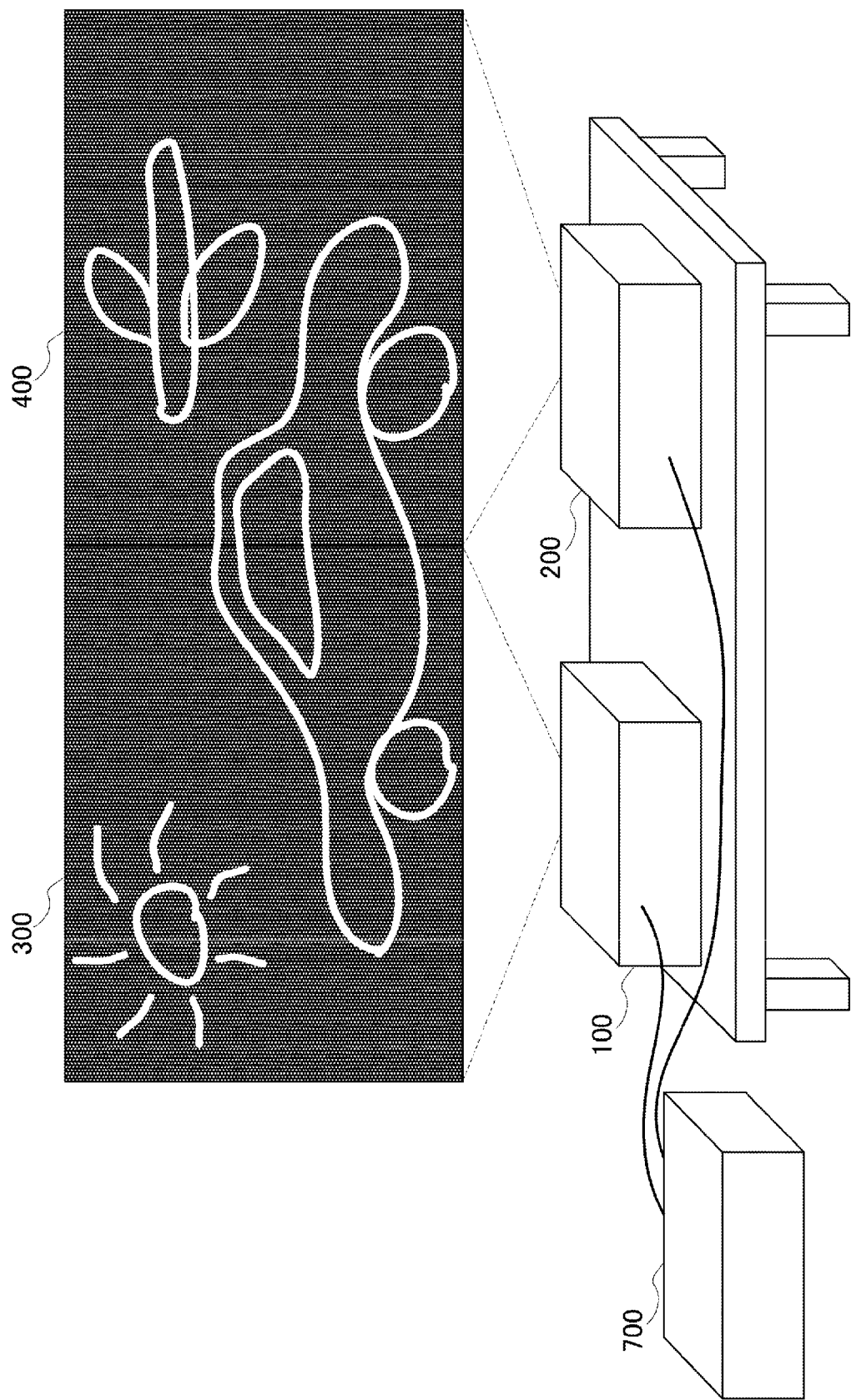

DISPLAY SYSTEM, DISPLAY APPARATUS, AND METHOD FOR CONTROLLING DISPLAY SYSTEM FOR DISPLAYING ONE IMAGE BY COMBINING TWO IMAGES

BACKGROUND OF THE INVENTION

1. Field of the Invention

The present invention relates to a display system, display apparatus, and method for controlling display system.

2. Description of the Related Art

Conventionally, a so-called multi-projection system is known in relation to projectors, in which a large screen is constructed by arranging a plurality of projected images in a form of tiles. In this system, in order to provide an inconspicuous seam or joint between adjoining images when the images are arranged in the form of tiles, a so-called edge blending process is applied, in which the luminance is lowered in a part of a display area of each of the projectors, followed by being overlapped so that the seam is hardly recognized. In this procedure, the overlapped area has a brightness corresponding to an amount to be provided by the two projectors. Therefore, a problem arises such that the overlapped area has a high black level (luminance level of a projected image corresponding to an input of the lowest (minimum) gradation value ("black" image)) as compared with areas other than the overlapped area. This problem is solved, for example, in Japanese Patent Application Laid-open No. 10-90645 such that the chromaticity and the luminance, which are obtained from a projection light, are measured, and the projection light is corrected on the basis of results of the measurement.

However, in the case of the conventional technique disclosed in Japanese Patent Application Laid-open No. 10-90645, it is necessary that a camera for measuring the projected image should be carried on the projection apparatus. Therefore, the cost is required corresponding thereto.

SUMMARY OF THE INVENTION

In view of the above, the present invention provides a technique which makes it possible to easily perform the luminance adjustment in order to uniformize luminance levels of respective projected images when a user performs the multi-projection while aligning the projected images of a plurality of projection apparatuses.

The present invention resides in a display system for displaying one image on a display surface by combining a first image displayed by a first display apparatus and a second image displayed by a second display apparatus, wherein:

the first display apparatus displays a first index image at a position which is close to the image displayed by the second display apparatus and which is included in a display range of the first display apparatus, the first index image having a predetermined color and the image having luminances which are changed in a direction parallel to a side adjacent to the image displayed by the second display apparatus; and the first display apparatus corrects the image displayed by the first display apparatus on the basis of a designated position of the first index image.

The present invention resides in a first display apparatus for displaying one image composed of a first image and a second image on a display surface by projecting the first image onto a position adjacent to the second image projected by a second display apparatus, the first display apparatus comprising:

a display unit which displays the image on the display surface; and a receiving unit which receives the image to be displayed on the display surface, wherein:

the display unit displays a first index image at a position which is close to the image displayed by the second display apparatus and which is included in a display range of the display unit, the first index image having a predetermined color and the image having luminances which are changed in a direction parallel to a side adjacent to the image displayed by the second display apparatus; and the display unit corrects the image received by the receiving unit on the basis of a designated position of the first index image.

The present invention resides in a method for controlling a display system for displaying one image on a display surface by combining a first image displayed by a first display apparatus and a second image displayed by a second display apparatus, the method comprising:

controlling the first display apparatus so that a first index image is displayed at a position which is close to the image displayed by the second display apparatus and which is included in a display range of the first display apparatus, the first index image having a predetermined color and the image having luminances which are changed in a direction parallel to a side adjacent to the image displayed by the second display apparatus; and controlling the first display apparatus so that the image displayed by the first display apparatus is corrected on the basis of a designated position of the first index image.

Further features of the present invention will become apparent from the following description of exemplary embodiments with reference to the attached drawings.

BRIEF DESCRIPTION OF THE DRAWINGS

FIGS. 1A and 1B show multi-projection images to be provided before and after the black level correction in a first embodiment.

DESCRIPTION OF THE EMBODIMENTS

First Embodiment

<Explanation of Outline of Projector>

In this embodiment, liquid crystal projectors are used as exemplary projection apparatuses by way of example. For example, the single-panel system and the 3-panel system are generally known for the liquid crystal projector. However, the present invention is applicable to the liquid crystal projector of any one of the systems described above. The liquid crystal projector of this embodiment displays an image based on an image signal such that the light transmittance of the liquid crystal element of a liquid crystal panel is controlled for each of pixels in accordance with the inputted image signal, and the light from a light source, which has been transmitted through the liquid crystal element, is projected onto a screen.

Figure 2:
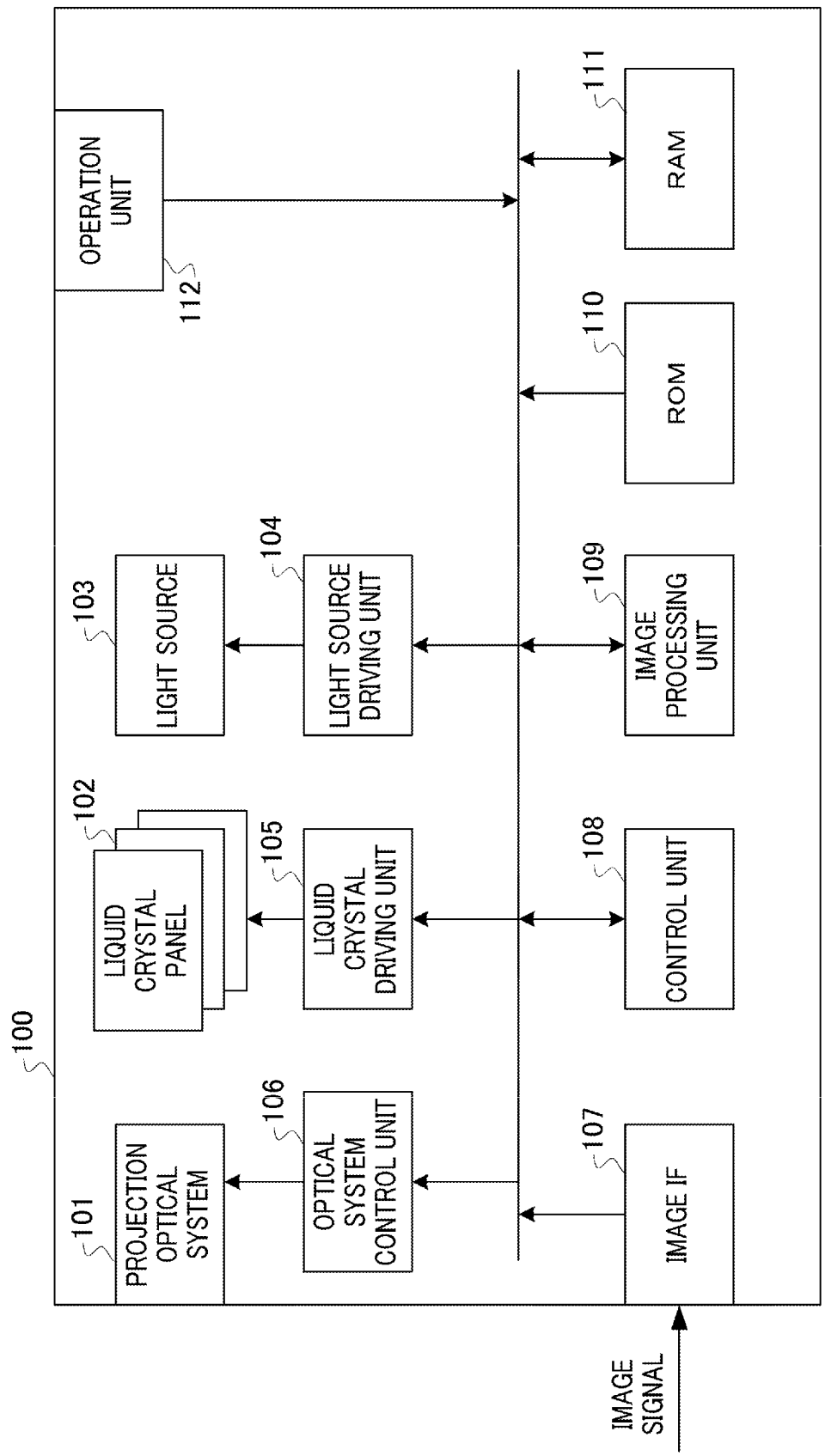
FIG. 2 shows a construction of a projector according to the first embodiment.

FIG. 2 shows an internal construction of a projector 100. The projector 100 is composed of a projection optical system 101, liquid crystal panels 102, a light source 103, a light source control unit 104, a liquid crystal driving unit 105, an optical system control unit 106, an image IF 107, a control unit 108, an image processing unit 109, ROM 110, RAM 111, and an operation unit 112. In this embodiment, it is assumed that a projector 200 is also constructed in the same manner to have an equivalent function.

Next, the respective components described above will be explained in detail. The projection optical system 101 synthesizes or combines displayed images of the liquid crystal panels 102, and an obtained image is projected onto the screen. The projection optical system 101 includes a plurality of lenses and actuators for driving the lenses. The lens is driven by the actuator, and thus it is possible to perform, for example, the magnification and the reduction of the projected image as well as the focus adjustment.

The liquid crystal panels 102 are provided for the respective colors of red (R), green (G), and blue (B). The transmitting light amount is regulated for each of the pixels of the liquid crystal panel 102 of each of the colors RGB in relation to the light of each of the colors RGB allowed to come into the liquid crystal panels 102. The transmittance is controlled in accordance with the image signal of each of the colors RGB. The lights of the respective colors RGB, which are transmitted through the liquid crystal panels 102 of the respective colors, are synthesized or combined again by the aid of prisms (not shown), and the synthesized or combined light is projected through the projection optical system 101.

The light, which is allowed to outgo from the light source 103, is separated by mirrors (not shown) into the lights of the respective colors RGB, and the lights are allowed to come into the liquid crystal panels 102 of the respective colors RGB respectively.

The light source control unit 104 performs, for example, the adjustment of the light amount of the light source 103 and the ON/OFF control of the irradiation on the basis of a control command sent from the control unit 108 as described later on.

The liquid crystal driving unit 105 adjusts the transmittance of the liquid crystal panel 102 of each of the colors RGB on the basis of the inputted image data. The liquid crystal driving unit 105 controls the liquid crystal panels 102 so that the transmittance of the liquid crystal panel 102 of each of the colors RGB is the transmittance which corresponds to the gradation value of the component of each of the colors RGB of the inputted image signal.

The optical system control unit 106 performs various types of adjustment, for example, for the zoom ratio, the shift amount, and the focus of the projection optical system 101 on the basis of a control command sent from the control unit 108.

The image IF 107 is an interface which is provided to effect the connection, for example, with respect to an image output apparatus. The image IF 107 is used to receive the image signal, the voice signal, and various control signals. The received image signal is transmitted by the image IF 107 to the image processing unit 109. When an analog image signal is received, the image IF 107 converts or transforms the received analog image signal into a digital image signal. The image IF 107 is exemplified, for example, by composite terminal, S terminal, D terminal, component terminal, analog RGB terminal, DVI-I terminal, DVI-D terminal, and HDMI (registered trademark) terminal. The image output apparatus may be any apparatus or device including, for example, personal computer, camera, mobile phone, smart phone, hard disk recorder, and game machine provided that the image signal can be outputted.

The control unit 108 performs, for example, the instruction to the respective functional units as well as the management of the internal state and the management of the projection mode of the projector 100 on the basis of programs stored in ROM as described later on.

The image processing unit 109 applies the image processing to the image signal received from the image IF 107, and the signal is transmitted to the liquid crystal driving unit 105. The image processing can be exemplified, for example, by the resolution transformation (conversion), the frame rate transformation (conversion), the shape deformation, the color tone transformation (conversion), the frame thinning out processing, the frame interpolation processing, the resolution transformation (conversion) processing, the distortion aberration correcting processing, the keystone correcting processing, and the edge blending processing. The image processing unit 109 is composed of, for example, a microprocessor for the image processing. Alternatively, it is unnecessary that the image processing unit 109 should be any exclusive microprocessor. The image processing unit 109 may be constructed, for example, such that the image processing as described above is performed by executing a program stored in ROM 110 by the control unit 108.

ROM 110 is used, for example, for the storage of the programs to control the respective functional units of the projector 100 and the storage of the data to be always retained.

RAM 111 is used, for example, for the temporary storage of the image data inputted from the image IF 107 and the image data to be used when the image processing is performed by the image processing unit 109 as well as for the work memory for the control unit 108.

The operation unit 112 resides in various operation buttons equipped for a casing of the projector 100, which provides an interface for inputting various instructions into the projector 100 by a user. The interface, which is usable to input the instruction into the projector 100, is not limited to the buttons equipped for the casing. The interface may be, for example, a remote controller.

<Explanation of Basic Operation of Projector>

Next, an explanation will be made about the basic operation of the projector 100. When the instruction of the user to turn ON the power source is received by the aid of the operation unit 112 or the remote controller (not shown), the control unit 108 gives the instruction to supply the power source from the power source unit (not shown) to the respective components of the projector 100.

The image IF 107 detects whether or not the image signal is inputted from the outside. If the image signal is not inputted, the image IF 107 waits until the input of the image signal is detected. If the image IF 107 detects the input of the image signal, the control unit 108 executes the projecting process for projecting the image. When the projecting process is executed, the image signal, which is inputted from the image IF 107, is transmitted to the image processing unit 109. The image processing unit 109 applies various types of the image processing as described above. The image signal, which is obtained after the image processing, is transmitted to the liquid crystal driving unit 105. The transmittances of the liquid crystal panels 102 of the respective colors are controlled on the basis of the image signal provided after the image processing. The lights of the respective colors RGB, which are transmitted through the liquid crystal panels 102 of the respective colors, are combined or synthesized, followed by being projected from the projection optical system 101. In this way, the projector 100 of this embodiment performs the projection of the image on the basis of the image signal outputted, for example, from the external image output apparatus.

<Multi-Projection>

In this embodiment, the black level correction is performed in order to uniformize the black level between the projectors when the multi-projection is performed by using the plurality of liquid crystal projectors.

The multi-projection resides in such a projection method that one image (one frame image) is projected by means of a plurality of projectors. In the multi-projection, the image data is divided into pieces of data of a plurality of partial images which are inputted into the plurality of projectors. The projection positions, which are provided by the plurality of projectors, are adjusted so that the projected images of the plurality of partial images, which are formed by the plurality of projectors, are seamed or stitched with each other on a projection surface (screen). Accordingly, one projected image is formed by combining the projected images of the plurality of projectors.

FIG. 1A shows a state in which the multi-projection is performed by using the two projectors. Note PC 700, which is the image output apparatus, outputs the image signals to the projector 100 and the projector 200 respectively. The projector 100 projects a projected image 300, and the projector 200 projects a projected image 400. The positions on the table (stand) are adjusted for the projector 100 and the projector 200 so that the right side of the projected image 300 and the left side of the projected image 400 are seamed or stitched with each other on the projection surface. It is herein assumed that the shape correction such as the keystone correction or the like is not taken into consideration in relation to the projected image.

The black level refers to the luminance level of the projected image corresponding to the lowest gradation value of the inputted image signal. The luminance of the projected image differs among the respective projectors even when an image having the same gradation value (for example, "black" image having a gradation value of 0) is inputted into the plurality of projectors, on account of the time-dependent change and/or the difference among individuals of the projectors. In the case of the example shown in FIG. 1A, as for the background images which should originally have the same luminance level, the luminance is lower in the projected image 300 of the projector 100 as compared with the projected image 400 of the projector 200. If the luminance levels of the projected images, which correspond to the input of the same gradation value, are dispersed as described above, the image quality is lowered in the image obtained by the combination or synthesis by means of the multi-projection.

In order to correct the dispersion of the luminance level of the projected image for each of the projectors when the "black" image is inputted, the black level correction is performed in this embodiment. In the black level correction, the correction is performed for the image processing performed to transform or convert the input gradation value into the transmittance of the liquid crystal panel. In this embodiment, the correction is performed for the luminance level of the projected image when the "black" image (uniform image in which the gradation value is 0) is inputted. In this embodiment, the projector, which is included in the plurality of projectors and which has the highest luminance of the projected image when the "black" image is inputted, is used as the reference, and the black level correction is performed so that the luminances of the projected images of the other projectors, which are provided when the "black" image is inputted, are matched or conformed with the concerning projector which serves as the reference. For example, the correction is performed so as to increase the setting value of the transmittance corresponding to a certain input gradation, and thus the black level is raised. This embodiment is characterized in that GUI (Graphical User Interface) is displayed so that the user can efficiently perform the operation for conforming or adjusting the black level between the projector which serves as the reference and the projector which is provided as the adjustment objective. The display of GUI is performed, for example, by means of OSD (On Screen Display).

Figure 3:
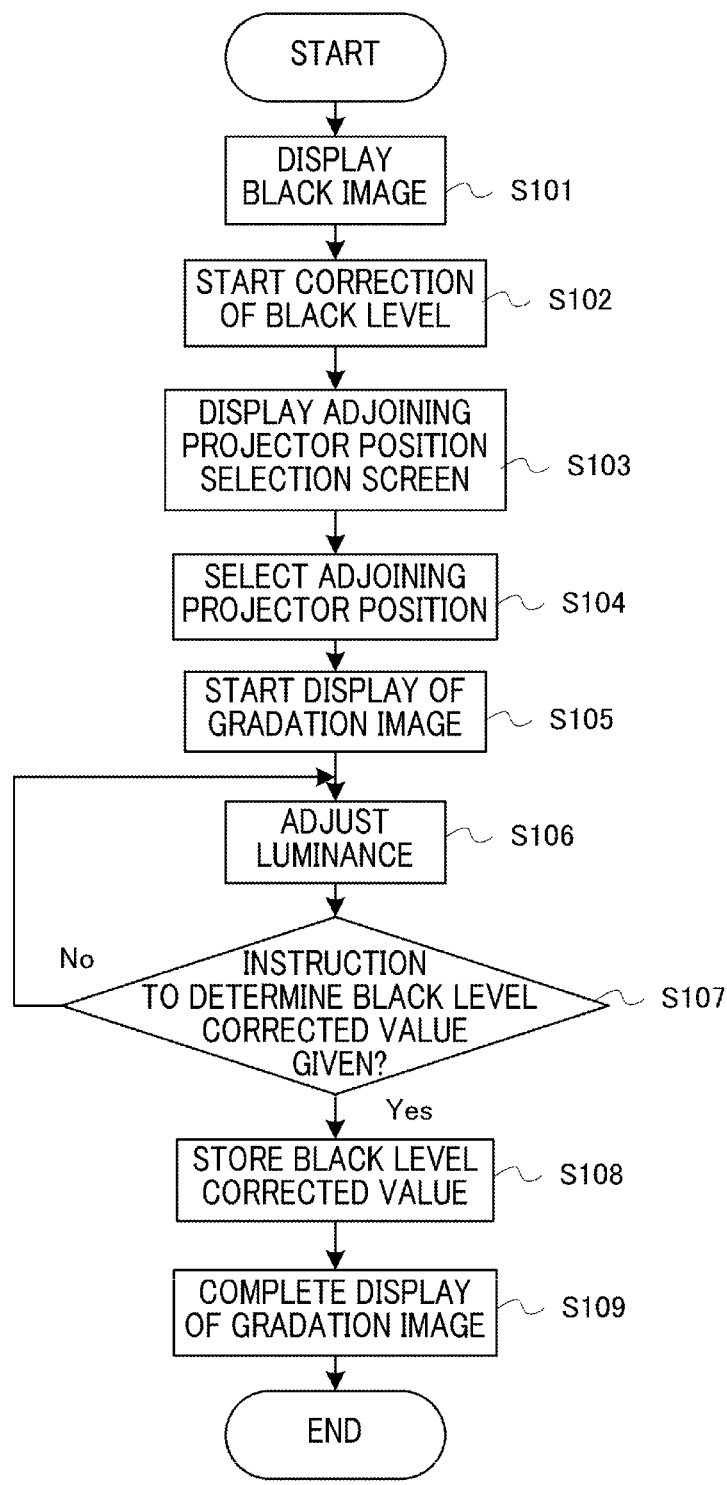
FIG. 3 shows a sequence of the black level correction in the first embodiment.

FIG. 3 shows a flow chart illustrating the processing procedure for the black level correction in this embodiment.

Figure 4A:
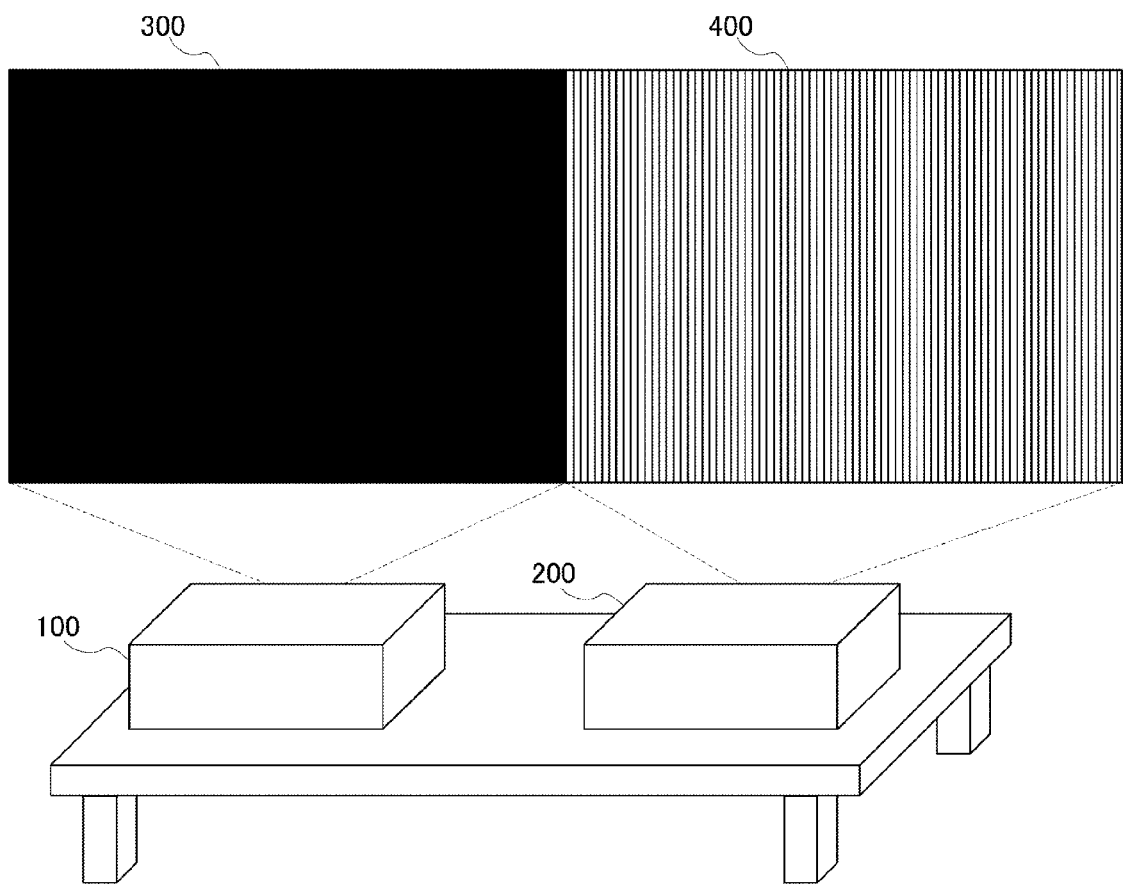
FIG. 4A shows a state in which the "black" image is projected in the first embodiment.

In S101, if the operation for instructing the execution of the black level correction is performed by the user by means of the remote controller or each of the operation units 112 of the projector 100 and the projector 200, the control unit 108 of each of the projectors performs the display processing for the "black" image. The display processing for the "black" image is carried out by performing the projection after executing the image processing of the initial setting of each of the projectors with respect to the "black" image data stored in ROM 110 of each of the projectors. That is, the control unit 108 transmits the "black" image data to the image processing unit 109 so that the image processing is executed by using the present setting. The "black" image data, to which the image processing is applied, is transmitted to the liquid crystal driving unit 105. In other words, the present setting is used as the relationship of the transmittance with respect to the input gradation to calculate the transmittance of the liquid crystal panel 102 corresponding to the "black" image data, and the transmittance is inputted into the liquid crystal panel 102. Accordingly, the liquid crystal driving unit 105 allows the liquid crystal panel 102 to display the image based on the "black" image data, and the "black" image is projected by the aid of the projection optical system 101. Accordingly, as shown in FIG. 4A, each of the two projectors 100, 200 is in a state in which the "black" image is projected. In this embodiment, as shown in FIG. 4A, the luminance of the projected image 300 of the projector 100 is lower than the luminance of the projected image 400 of the projector 200, while the same "black" image data is inputted.

In this embodiment, the projection is performed such that at least the "black" image projected by the projector 100 and the "black" image projected by the projector 200 are adjacent to one another. That is, the end portion (side) disposed on the side of the projector 200 of the "black" image projected by the projector 100 or the area including the end portion (side) is overlapped or allowed to make contact with the end portion (side) disposed on the side of the projector 100 of the "black" image projected by the projector 200 or the area including the end portion (side).

In S102, when the user performs the operation for inputting the instruction to start the black level correction with respect to the projector 100 by means of the operation unit 112 or the remote controller, the control unit 108 of the projector 100 starts the black level correcting process. In this case, as shown in FIG. 4A, the black level of the projector 100 is lower than the black level of the projector 200. Therefore, the black level of the projector 100 is adjusted (raised) so that the black level of the projector 100 is conformed or matched with the black level of the projector 200. For this purpose, the user inputs, into the projector 100, the instruction to start the execution of the black level correcting process. If the relationship of the high/low black level is reversed or opposite, the user inputs, into the projector 200, the instruction to start the execution of the black level correcting process. If the multi-projection is performed by using three or more projectors, there are the projector having the highest black level and the other projectors. The user inputs, into the other projectors, the instruction to start the execution of the black level correcting process so that the black levels of the other projectors are conformed or matched with that of the projector having the highest black level. When the black level correcting process is performed for a plurality of projectors, then the black level correcting process may be executed for the projectors one by one, or the black level correcting process may be executed simultaneously for the plurality of projectors.

Figure 4B:
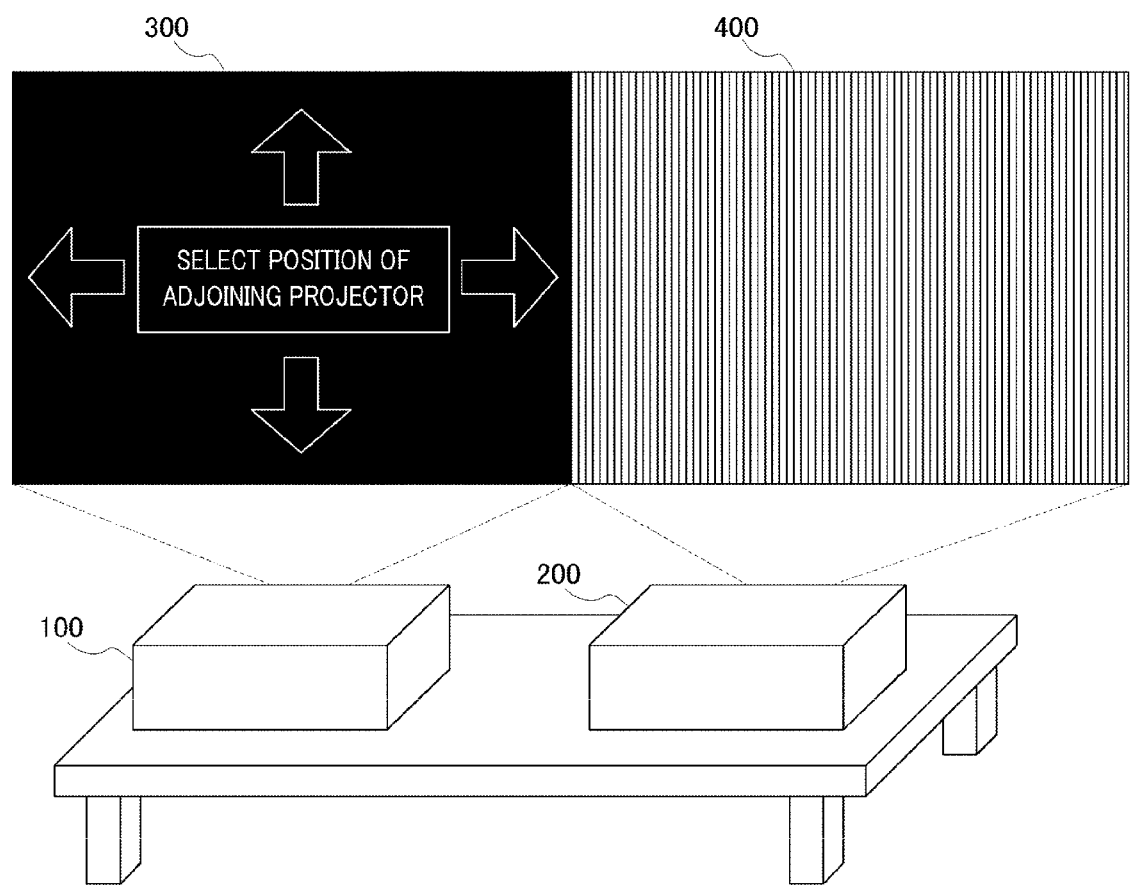
FIG. 4B shows an adjoining projector position selection screen in the first embodiment.

In S103, the control unit 108 of the projector 100 displays an adjoining projector position selection screen shown in FIG. 4B. The adjoining projector position selection screen is the screen which allows the user to designate the position at which the "black" image projected by the projector 200 adjacent to the projector 100 adjoins the "black" image projected by the projector 100. As shown in FIG. 4B, the control unit 108 of the projector 100 performs the control so that the image, in which the image signal of the adjoining projector position selection screen is superimposed with the image signal to be projected ("black" image), is projected. The user designates the adjoining position by performing the operation for selecting the side at which the projected image 400 adjoins, of the four sides of the projected image 300, in relation to the position of the projected image 400 adjacent to the projected image 300 of the projector 100 on the adjoining projector position selection screen. The position of the adjoining projector may be previously inputted into the projector 100. Alternatively, if the note PC 700 transmits the screen position information together with the divided image, the position of the adjoining projector may be specified on the basis of the screen position information. That is, if the screen position information indicates "left", such a situation is assumed that the adjoining projector projects the right side of the projected image. Therefore, the position of the adjoining projector may be determined on the basis of the screen position information.

Figure 5A:
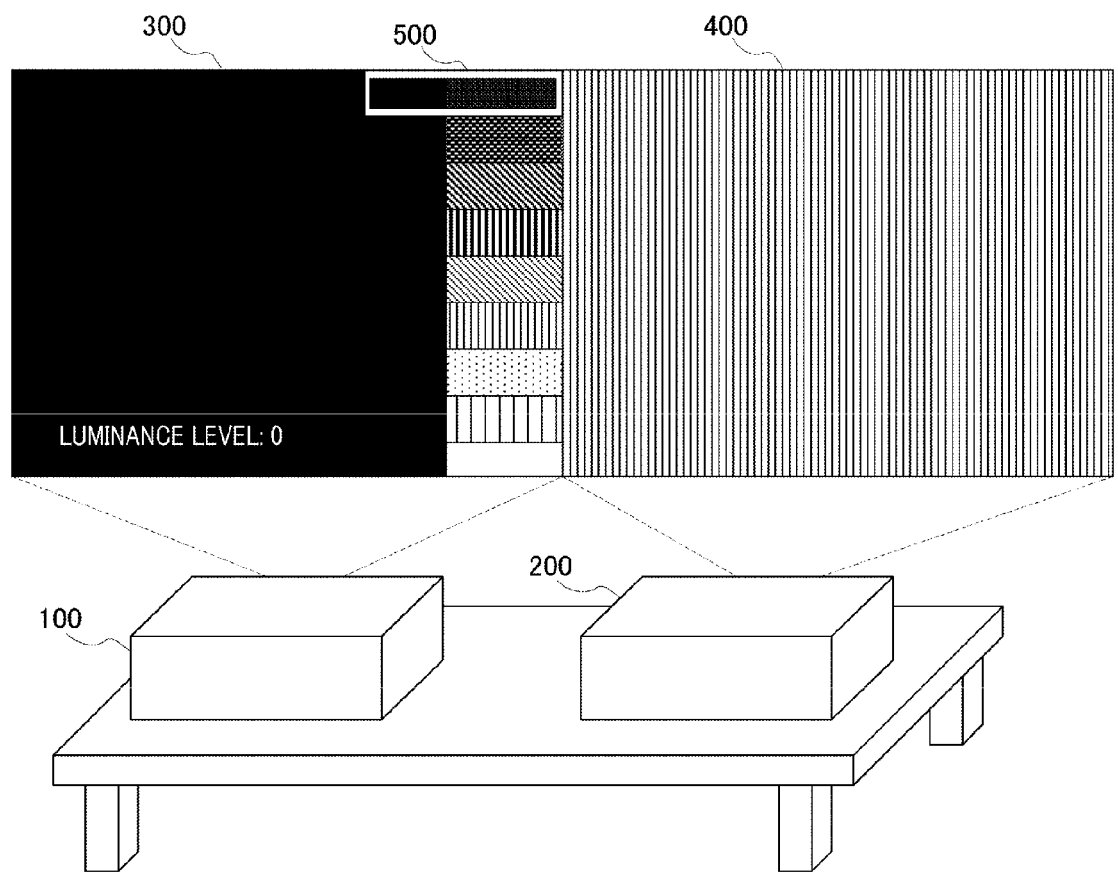
FIG. 5A to 5D show a process of the black level correction in the first embodiment.
Figure 5B:
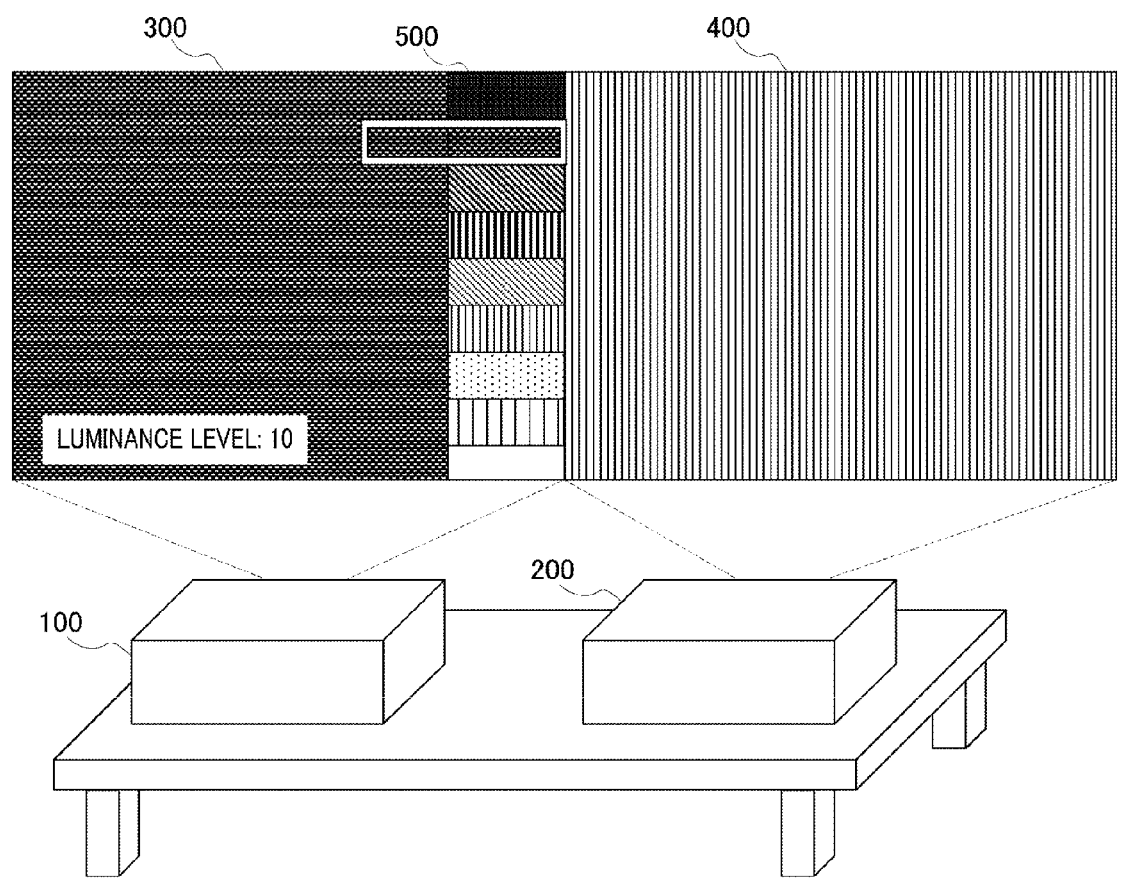
Figure 5C:
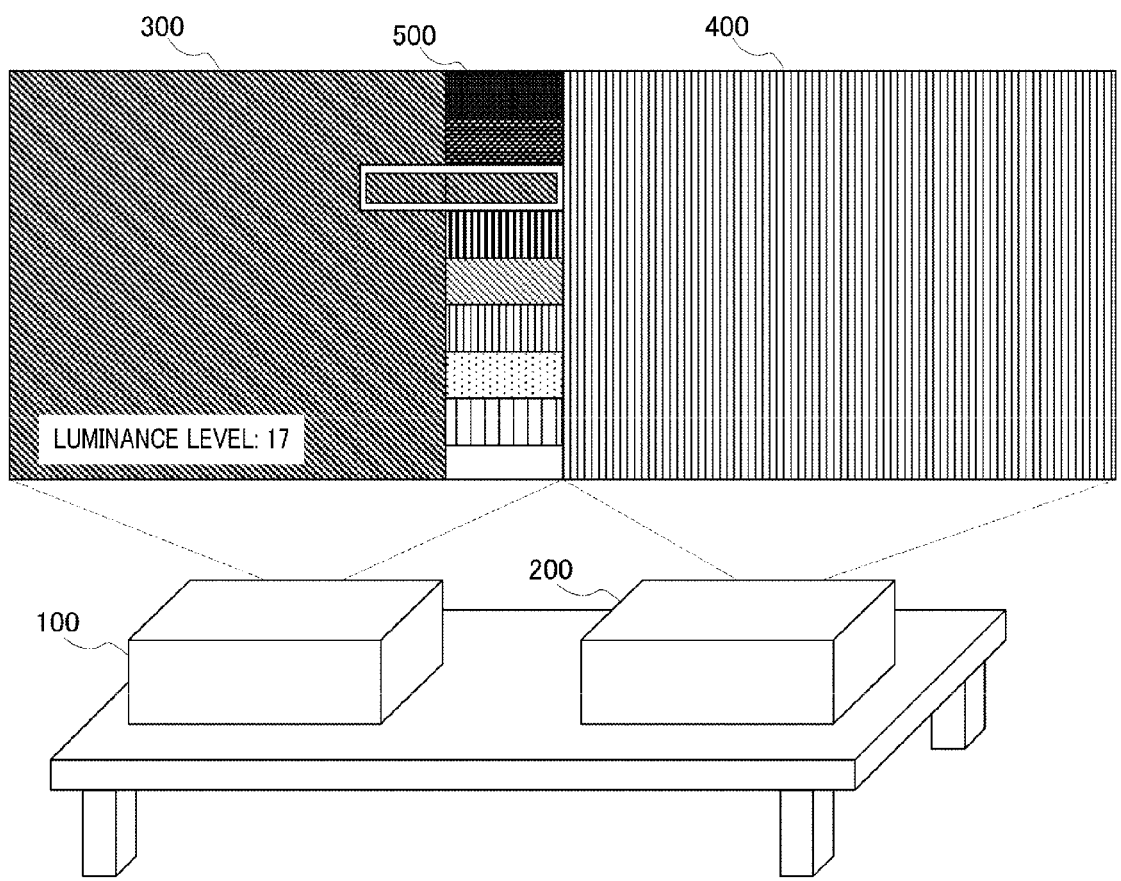

In S104, if the side (adjoining side), which indicates the adjoining projector position, is selected by the user, the control unit 108 of the projector 100 executes the display of the luminance adjustment screen to assist the black level correction as shown in FIG. 5A in S105. The luminance adjustment screen is constructed to include a gradation image 500 in which the luminance is gradually changed in the direction parallel to the adjoining side, in the screen end portion area including the adjoining side designated by the user in S104, of the projected image 300. The control unit 108 of the projector 100 superimposes the gradation image 500 on a partial area of the "black" image so that all of the "black" image projected by the projector 100 (the same machine itself or subject machine) is not disappeared by the gradation image 500. This embodiment is illustrative of such an exemplary case that the gradation image is displayed at the endmost portion. However, it is also allowable to display any intervening other image such as the black image or the like. In this embodiment, the gradation image may be displayed at any position provided that the user can confirm the black image of the adjoining projector at the position. For example, the gradation image may be displayed at a position close to the projected image of the adjoining projector as compared with the center of the display screen. That is, the control unit 108 controls the liquid crystal driving unit 105 so that the gradation image is displayed at the position adapted to the position of the projected image of the adjoining projector.

In S106, the user views and compares the projected image 400 projected by the projector 200 and the gradation image 500 to adjust the black level of the projector 100. The user can perform the adjustment of the black level of the projector 100 as follows. When the user performs the operation for changing the luminance of the projector 100 by means of the operation unit 112 or the remote controller, the control unit 108 controls the image processing unit 109 so that the display luminance of the "black" image is changed in the area of the projected image 300 other than the gradation image 500. Accordingly, the control unit 108 performs the luminance change for the "black" image. As shown in FIGS. 5A to 5D, the numerical value, which indicates the present luminance level (luminance level after the change performed by the user), is displayed in a superimposed manner in the display area of the "black" image of the projected image 300. Further, the control unit 108 displays a white frame image in a superimposed manner on a portion of the gradation image 500 having the same luminance as the luminance of the present "black" image. Therefore, if the user performs the operation for changing the luminance of the projector 100, then the white frame image is moved upwardly/downwardly on the gradation image 500, and the luminance of the "black" image is changed to the same luminance as the luminance of the portion at which the white frame image is present.

Figure 5D:
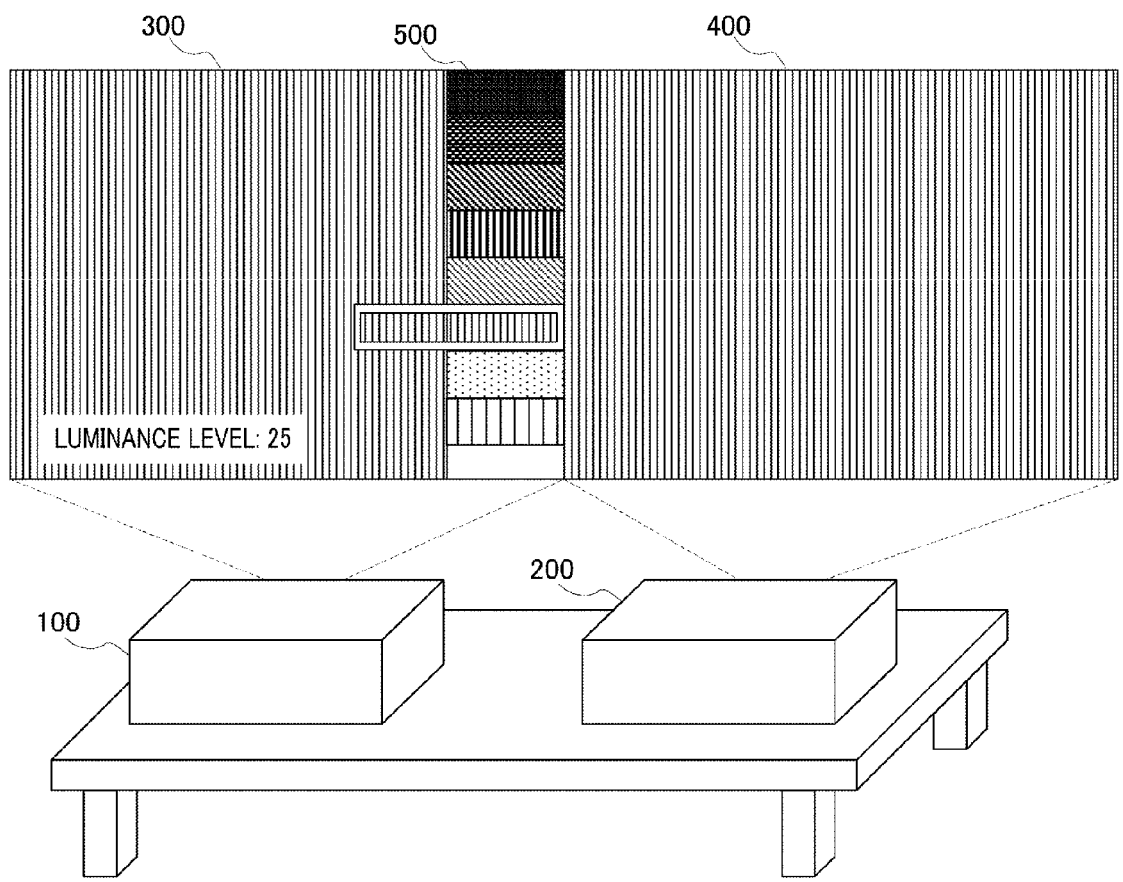
Figure 6:
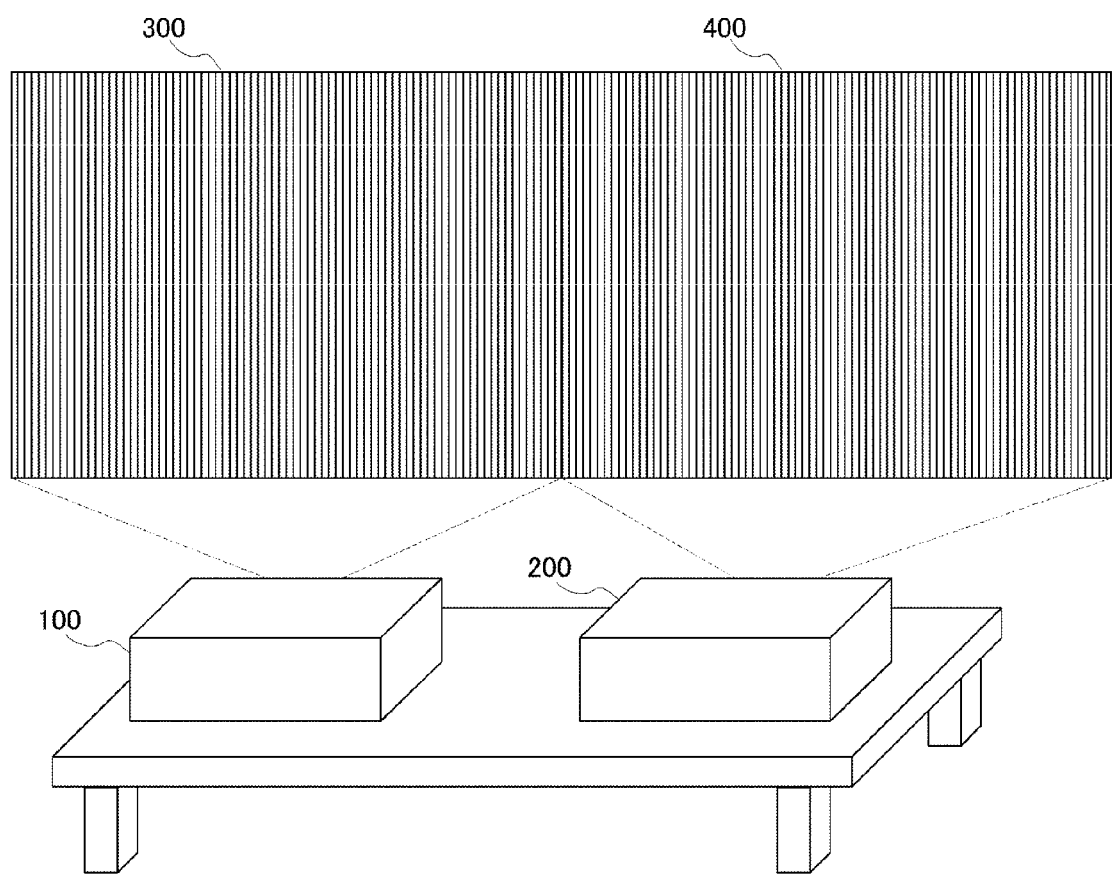
FIG. 6 shows the "black" image display after the completion of the black level correction in the first embodiment.
Figure 7A:
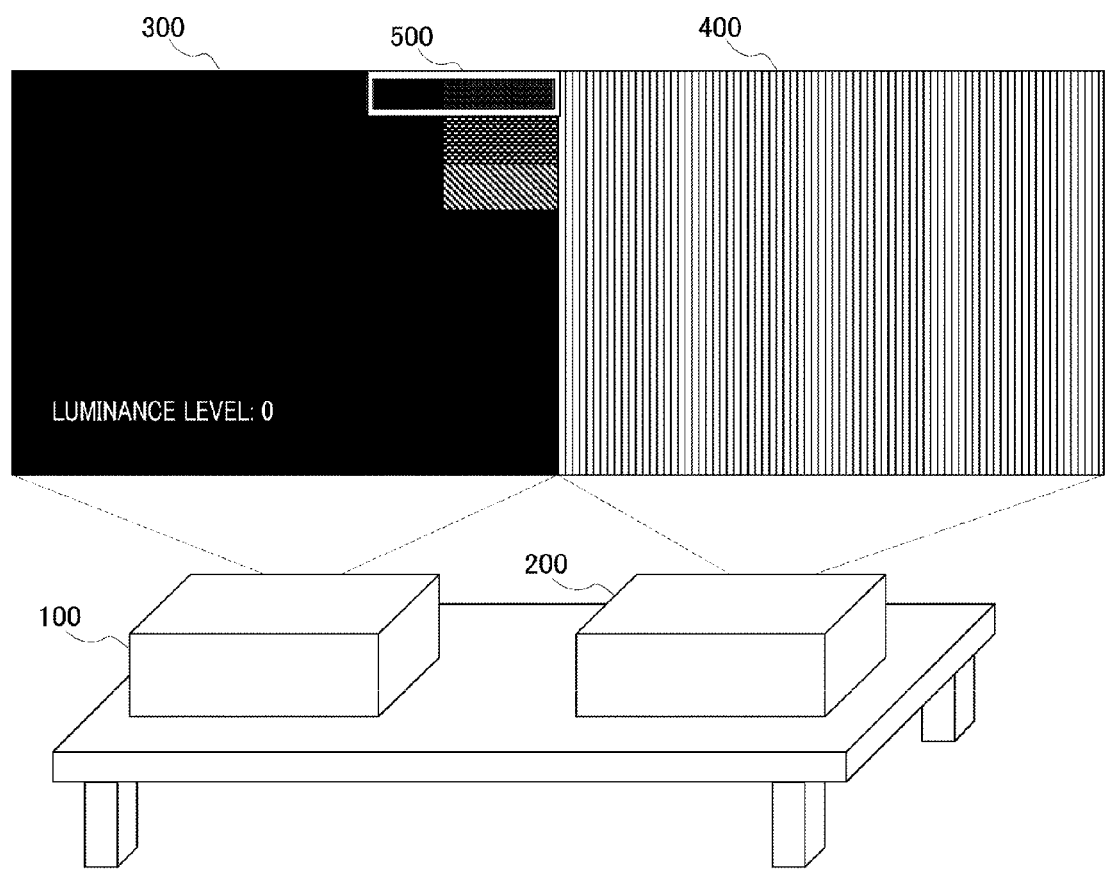
FIG. 7A to 7D show exemplary gradation images in each of which only the gradations in the vicinity of the present gradation are displayed.
Figure 7B:
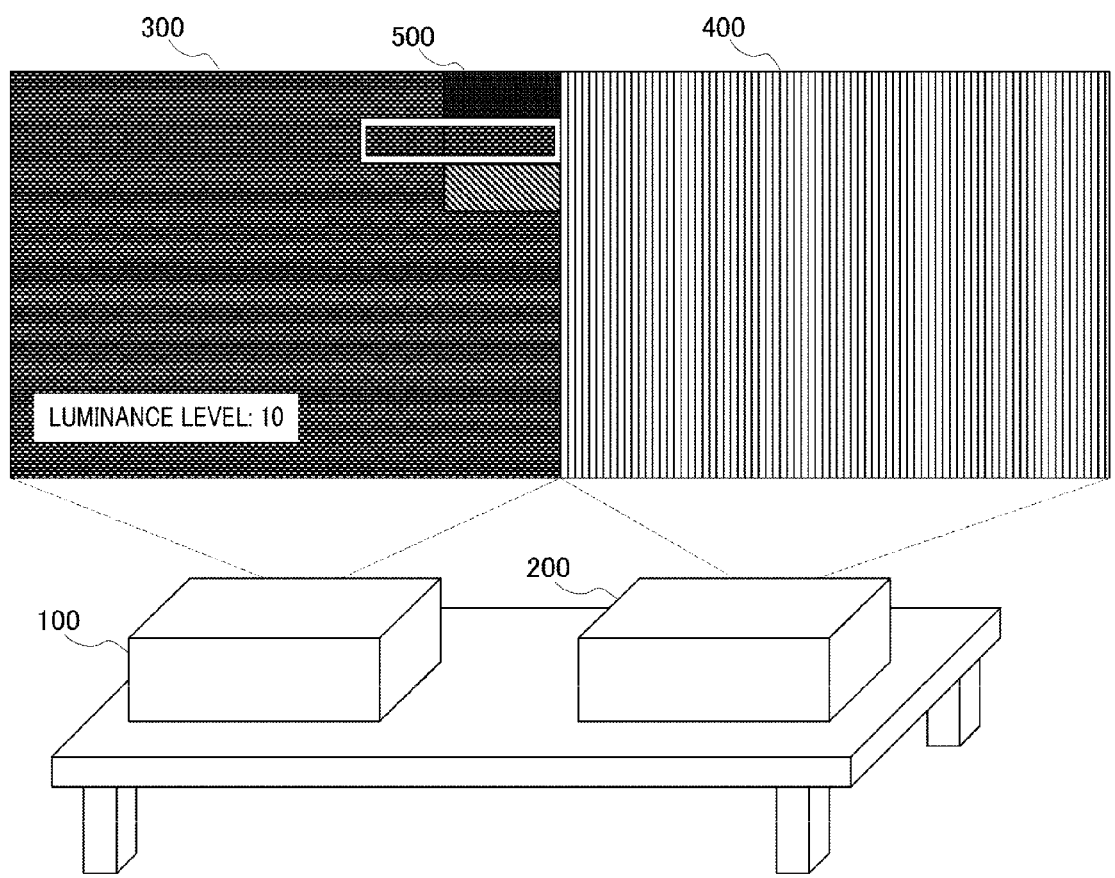
Figure 7C:
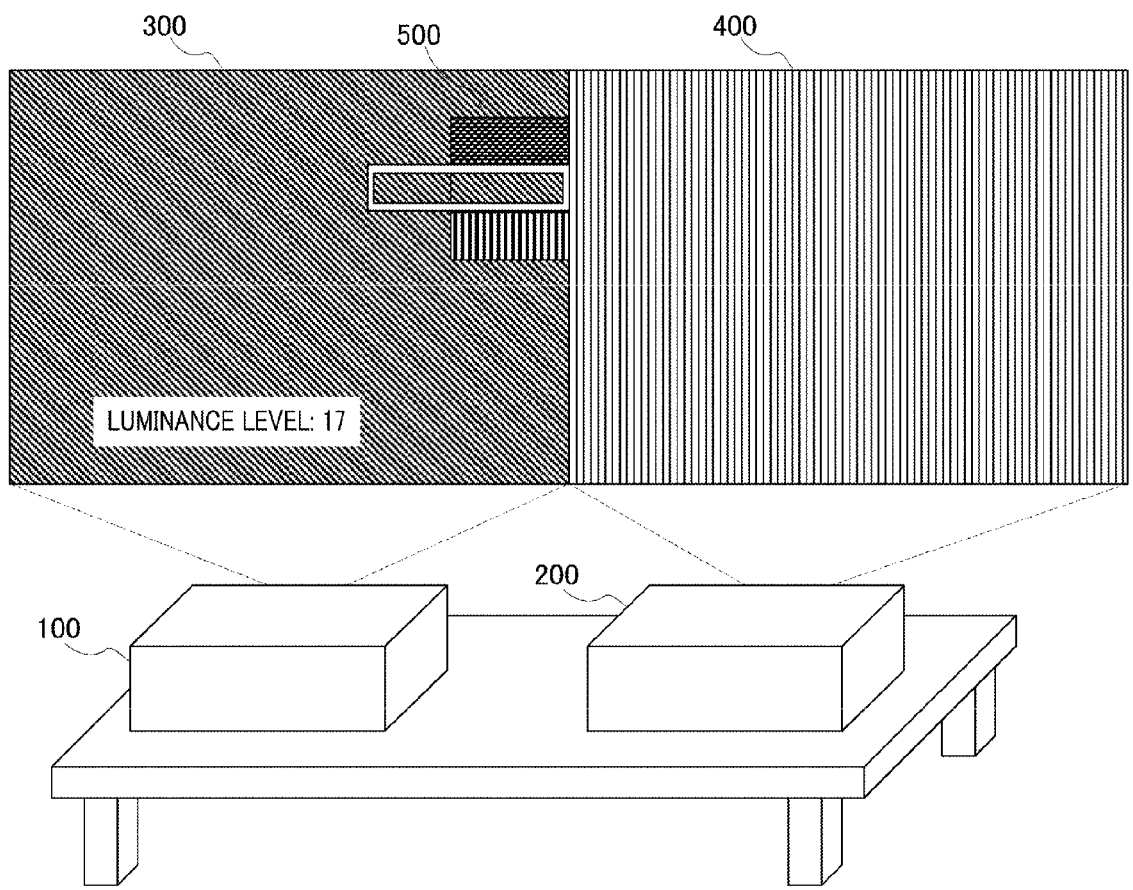
Figure 7D:
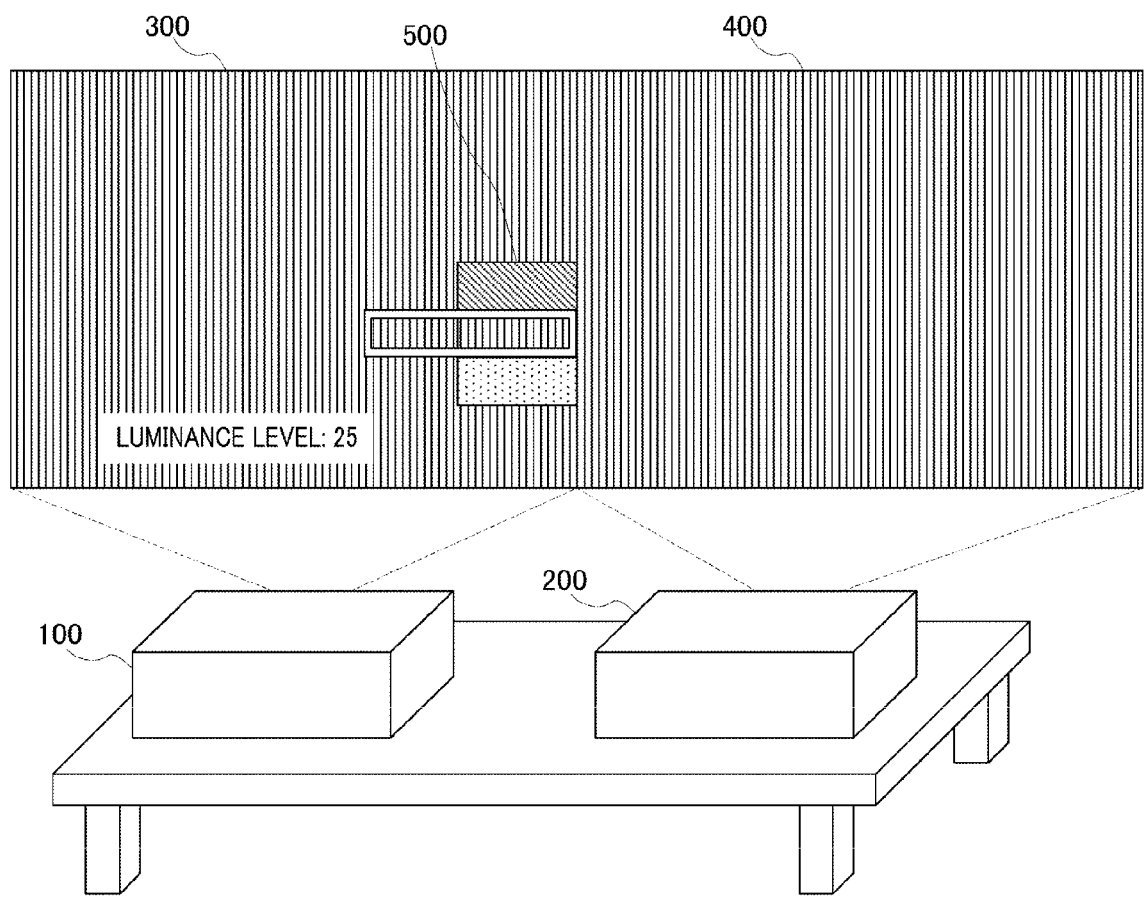

The user judges whether or not the luminance of the "black" image of the projected image 300 of the projector 100 is the same as the luminance of the "black" image of the projected image 400 of the projector 200, while changing the luminance of the "black" image of the projected image 300 of the projector 100. The operation in S106 is repeated until the former is the same as the latter. FIGS. 5A to 5D show situations in which the luminance level of the "black" image of the projected image 300 is progressively changed to 0, 10, 17, 25 by gradually moving the luminance of the "black" image projected by the projector 100 in the direction directed to the high luminance by the user. For example, if the user judges that the luminance of the "black" image of the projected image 300 is the same as the luminance of the "black" image of the projected image 400 in the state of the luminance level of 25 as shown in FIG. 5D, the user inputs the instruction to determine the corrected value of the black level. The black level corrected value is the value which is provided to correct the parameter of the image processing performed by the image processing unit 109 so that the liquid crystal panel 102 is driven with the present transmittance if the "black" image signal is inputted. If the determination of the black level corrected value is instructed (Yes in S107), the control unit 108 of the projector 100 stores the black level corrected value in ROM 110 (S108). The control unit 108 of the projector 100 completes the display of the luminance adjustment screen (for example, the "black" image, the gradation image 500, the white frame, and the luminance level value) in S109. In this procedure, it is also allowable that the display of the "black" image is not completed, and only the display of the gradation image 500 and the white frame is erased so that the display area of the gradation image 500 is subjected to the "black" image display. Accordingly, as shown in FIG. 6, it is possible to confirm the multi-projection image of the "black" image brought about by the two projectors. Therefore, the user can confirm whether or not the black levels of the two projectors are identical with each other again. If it is found that the black levels of the two projectors are not identical with each other in this state, the user can also execute the black level correcting process again as described above to perform the readjustment.

After S109, the projector 100 performs the image processing on the basis of the black level corrected value stored in S108 with respect to the image signal inputted from the note PC 700, and the image, which is based on the image signal after the image processing, is projected. Accordingly, as shown in FIG. 1B, the luminance levels are uniformized between the projected image 300 provided by the projector 100 and the projected image 400 provided by the projector 200. Therefore, the image quality is improved for the projected image brought about by the multi-projection based on the use of the two projectors.

In this embodiment, the gradation image is displayed between the projected image of the projector 200 which serves as the reference and the projected image of the projector 100 which is the correction objective. Accordingly, the user can perform the correction while visually confirming the actual degree of correction of the black level of the projector 100 as the correction objective so that the black level of the projector 100 as the correction objective can be matched or conformed with the black level of the projector 200 as the reference. Thus, the user can perform the black level correction more easily and precisely.

This embodiment is illustrative of such an exemplary case that the gradation image is displayed over the entire length of the adjoining side along with the adjoining side with respect to the projected image of the projector which serves as the reference. However, as shown in FIGS. 7A to 7D, it is also allowable to use a gradation image which is composed of only luminances in a predetermined range in the vicinity of the present black level of the projector as the correction objective. In this case, as shown in FIG. 7A to 7D, the position of the gradation image may be changed depending on the change of the luminance range. Alternatively, the gradation image may be displayed in a certain constant area (for example, an area disposed at a corner of the projected image in contact with the adjoining side and the upper side or the lower side).

In this embodiment, the black level is corrected in relation to the gray scale. However, the correction may be performed for each of the color components.

Figure 8:
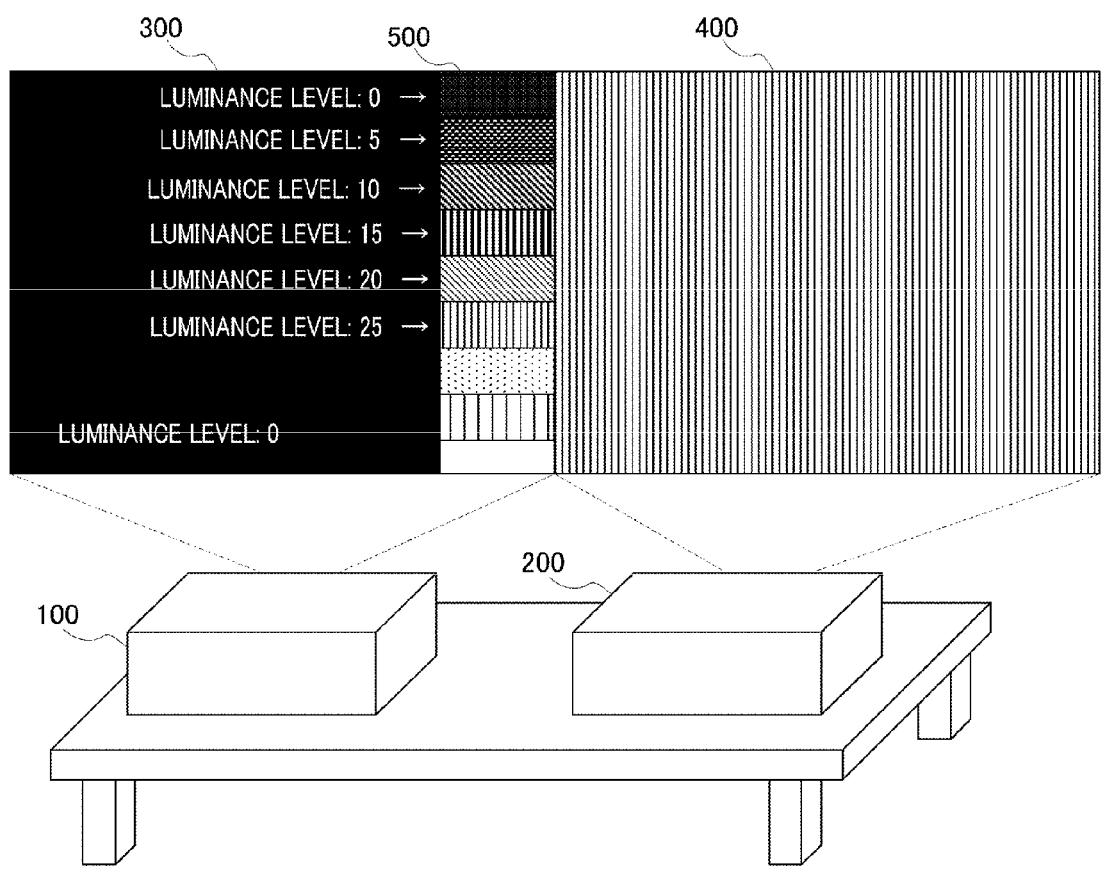
FIG. 8 shows an exemplary gradation image in which luminance level values are displayed.

As shown in FIG. 8, the luminance level values may be displayed in the gradation image. In an example shown in FIG. 8, the texts, which indicate the luminance level values, are displayed at portions of the luminance levels 0, 5, 10, 15, . . . in the gradation image.

This embodiment is illustrative of such an exemplary case that the gradation image, in which the luminance is raised from the upper portion of the screen to the lower portion of the screen, is displayed. However, the direction, in which the luminance is changed along the adjoining side, is not limited thereto. Further, the black level correction can be performed more finely when the minimum change amplitude of the luminance is smaller. However, the present invention is not especially limited thereto. When the gradation number of gradations is small, the user may appropriately select the luminance which is closest to the black level of the reference projector, from several luminances. Therefore, it is possible to perform the correcting operation easily and conveniently.

Figure 16A:
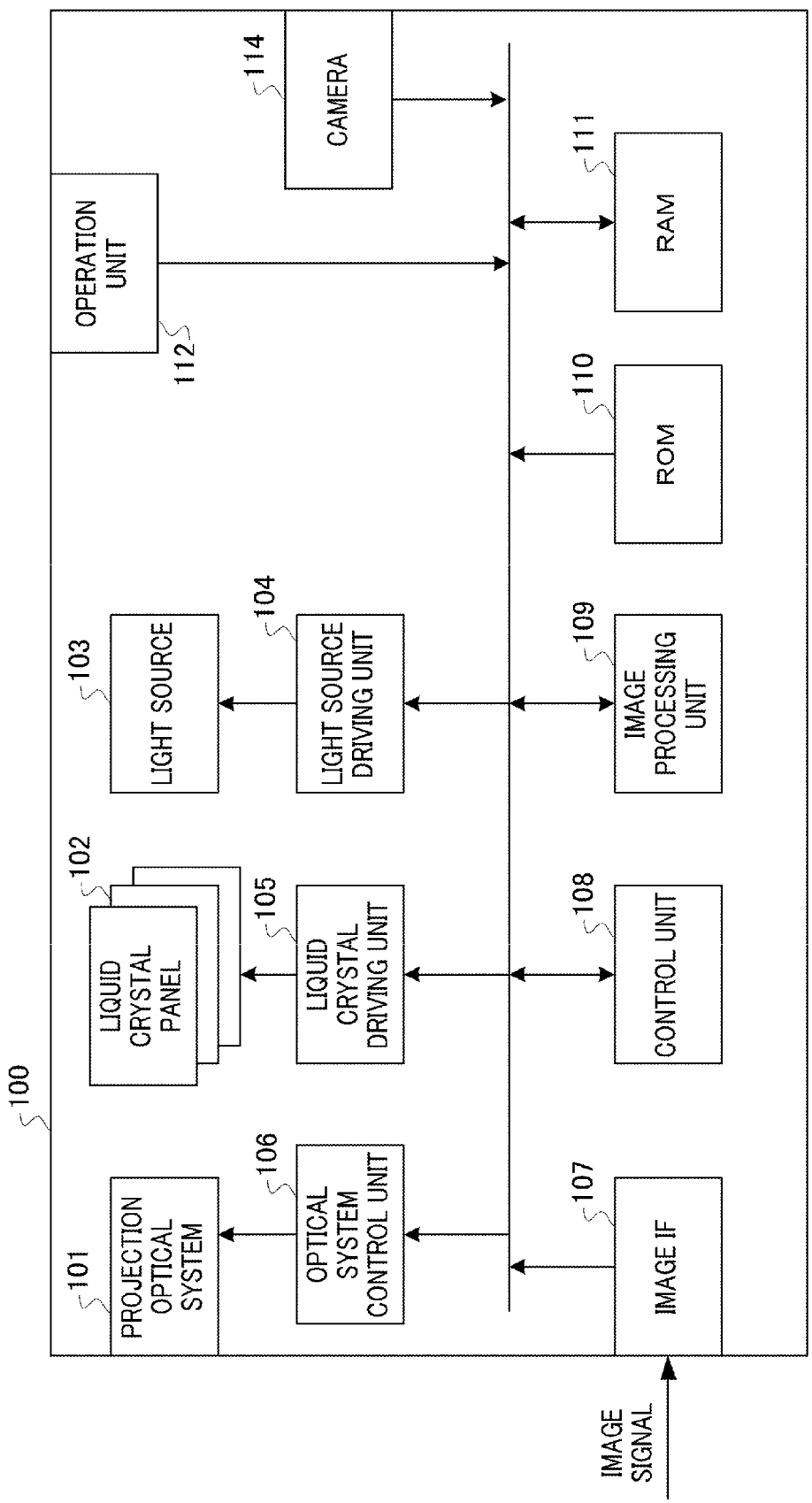
FIGS. 16A and 16B show constructions of projectors according to modified embodiments of the second embodiment.

This embodiment is illustrative of such an exemplary case that the black level correction is manually performed by the user. However, as shown in a block diagram of FIG. 16A, a camera 114, which measures the luminance of the projected image, may be provided, and the black level correction may be automatically performed by using measured values obtained by the camera 114. For example, the respective luminances of the gradation image and the luminance of the projected image 400 of the projector 200 are acquired by the camera 114. It is also appropriate that the obtained values are compared with each other, and thus the luminance, which is the same as the luminance of the "black" image of the projected image 400, is judged in relation to the gradation image.

In this way, the projection apparatus of this embodiment performs the following control if the instruction of the "black level correction" is inputted by the user. At first, the control unit 108 performs the control such that the "black" image, which is stored in ROM 110, is transmitted to the image processing unit 109, and the image processing unit 109 is controlled so that the image processing, to which the black level of the initial value is applied, is performed. The control unit 108 performs the control such that the "black" image, to which the image processing is applied, is transmitted to the liquid crystal driving unit 105, and the image, which indicates the "black" image, is projected. Subsequently, the control unit 108 reads, from ROM 110, the GUI data which is composed of the gradation image to serve as the index for the black level adjustment. The position information, which corresponds to the side designated as the side of the existence of the adjoining projector by the user, is added thereto and transmitted to the liquid crystal driving unit 105. Accordingly, the control unit 108 performs the control such that the luminance adjustment screen, which includes the gradation image, is projected onto the end portion area including the side on which the adjoining projector exists. Further, the information is displayed, wherein the information indicates which luminance of the gradation image is the same as the luminance of the "black" image of the projected image of the projector as the present correction objective (for example, the white frame superimposed on the gradation image). When the adjustment of the black level is performed by the user, the information is displayed, wherein the information indicates which portion of the gradation image has the luminance that is the same luminance as the display luminance of the "black" image after the adjustment. The gradation image is such a gradation image that the luminance is gradually changed in the direction parallel to the designated side. The control unit 108 changes the display luminance of the "black" image by changing the value of the transmittance outputted to the liquid crystal driving unit 105 depending on the "black" image. This operation can be performed by changing (correcting) the transformation function or the table for transforming the input gradation into the transmittance of the liquid crystal panel 102.

Preferred embodiments of the present invention have been explained above. However, the present invention is not limited to these embodiments, and the present invention can be variously modified and changed within the scope of the gist or essential characteristics thereof.

Second Embodiment

Figure 9A:
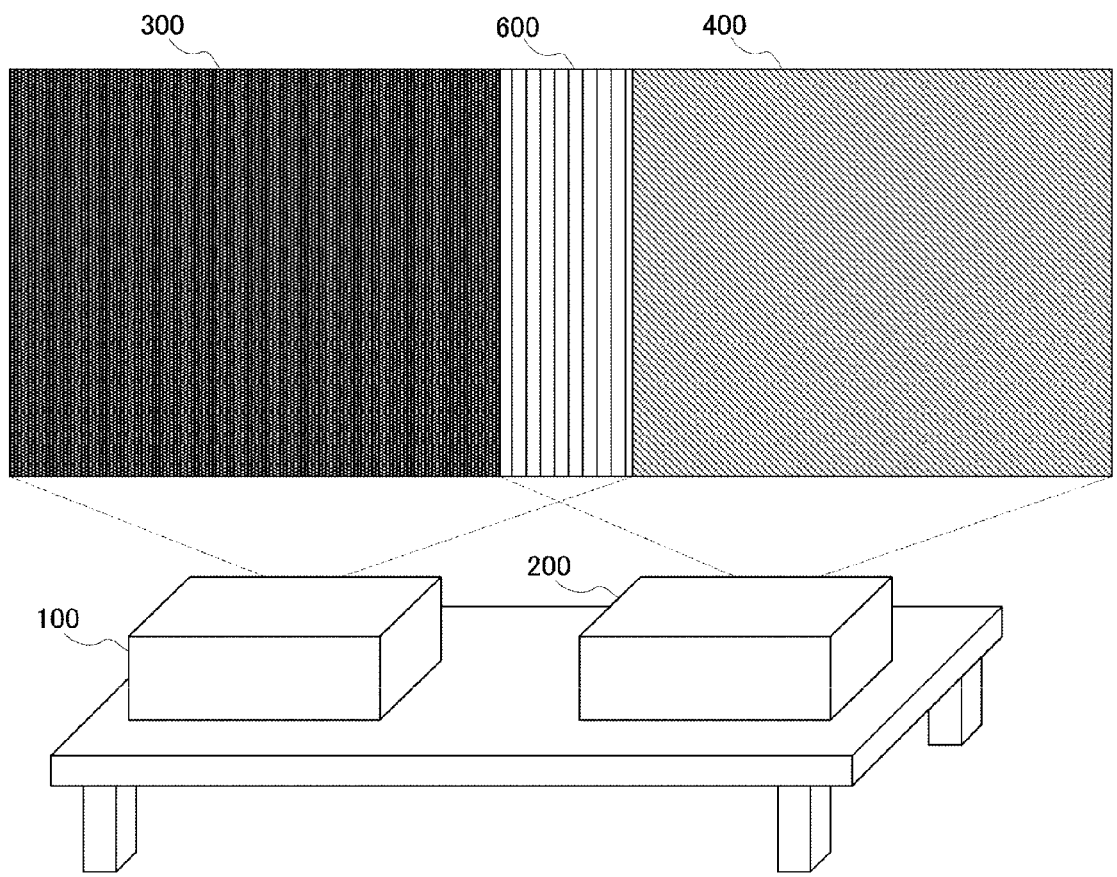
FIG. 9A to 9C show images to be provided before and after the blending and an image for adjusting the edge blending position in a second embodiment.
Figure 9B:
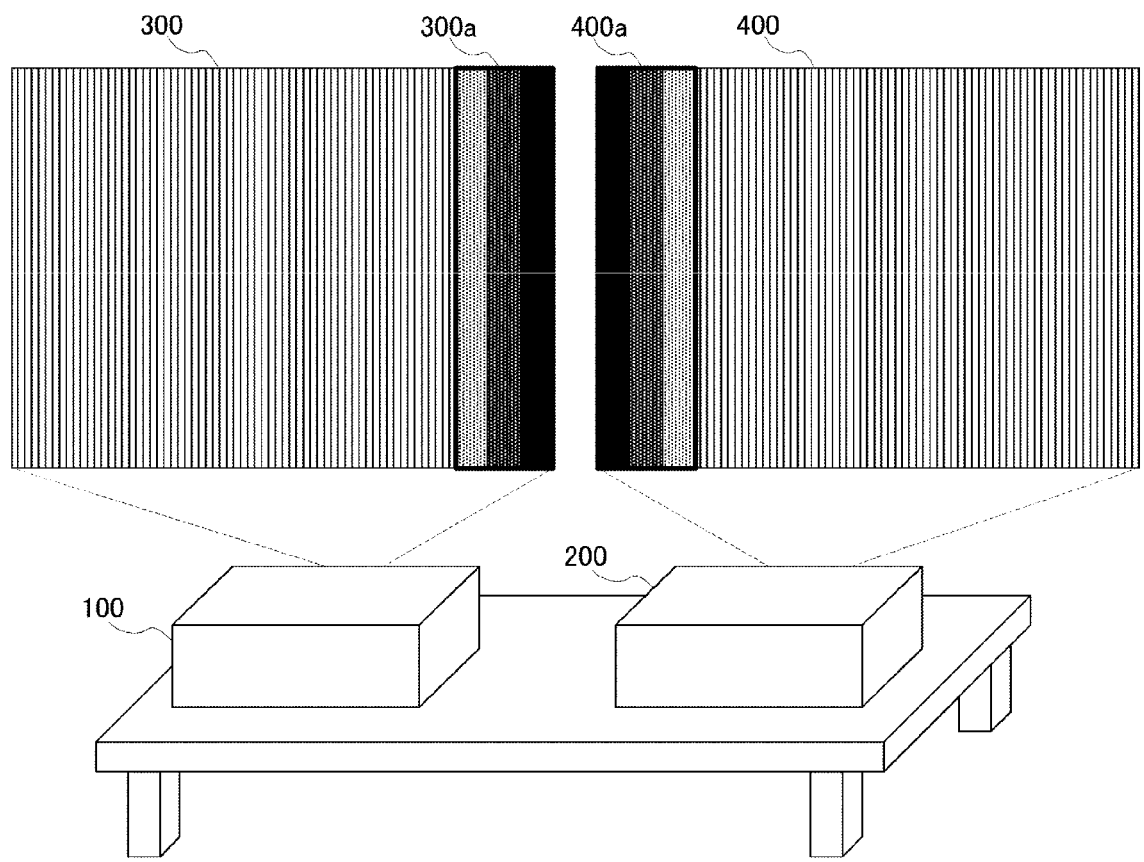

A second embodiment of the present invention will be explained below with reference to the drawings. In this embodiment, an explanation will be made about a method for correcting the dispersion of the black level between projectors when the edge blending multi-projection is performed by using the two liquid crystal projectors. As shown in FIG. 9A, the edge blending multi-projection resides in such a projection method that one projected image is constructed by mutually overlaying areas disposed in the vicinity of adjoining sides of mutually adjoining projected images formed by the two projectors. The overlaid area 600 is referred to as "blend area". In the edge blending multi-projection, as shown in FIG. 9B, the luminances of the portions (areas 300a and 400a indicated by black frames) corresponding to the blend areas of the projected images of the respective projectors are more lowered at positions nearer to the adjoining sides. Accordingly, the deviation or discrepancy of the overlay brought about by the two projectors can be made inconspicuous in the blend area.

The construction of the projector of this embodiment is the same as the construction of the projector explained in the first embodiment. Therefore, the same names and the same reference numerals as those of the first embodiment are used, any detailed explanation of which will be omitted.

Figure 15A:
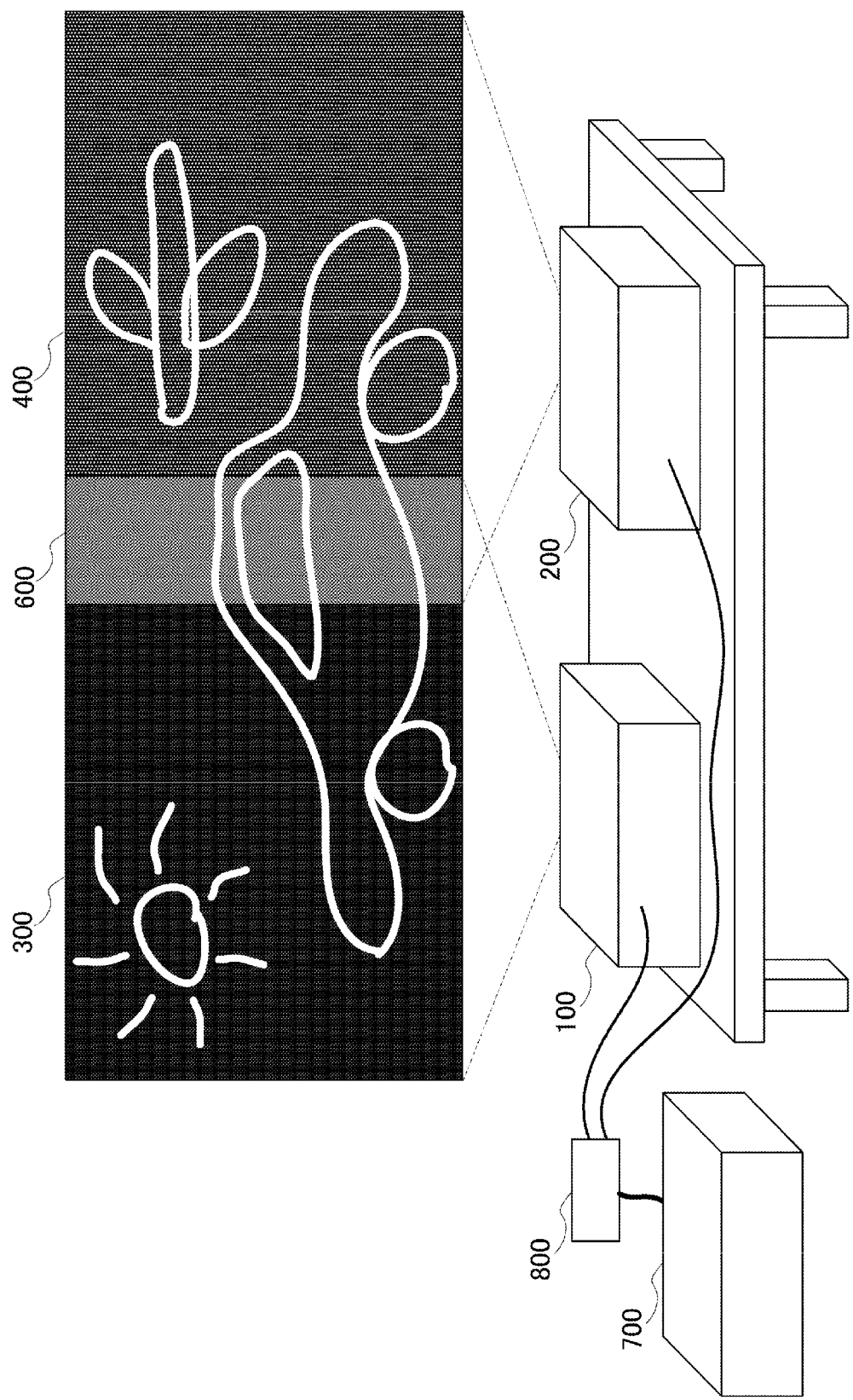
FIGS. 15A and 15B show multi-projection images to be provided before and after the black level correction in the second embodiment.

In this embodiment, as shown in FIG. 15A, the image signal, which is fed from the note PC 700 as the image output apparatus, is distributed by a distributor 800 to the two projectors 100, 200. The distributor 800 adds, to the image signal, the image information of the superimposing portions (blend area 600) of the projected images of the projector 100 and the projector 200, and the image signal is transmitted to the respective projectors. FIG. 15A shows the projected image obtained before performing the black level correction, in which the black levels are deviated among the projected image 300 of the projector 100, the projected image 400 of the projector 200, and the blend area 600.

Figure 10:
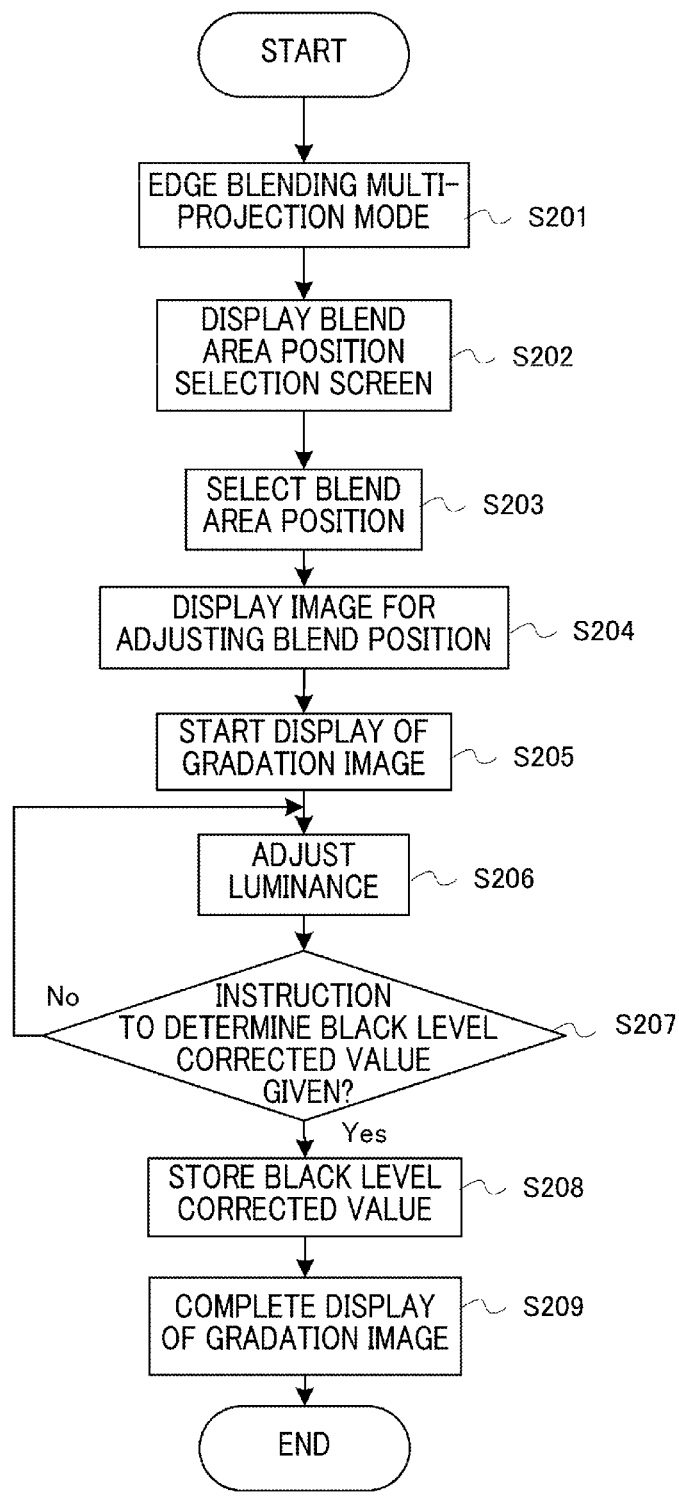
FIG. 10 shows a sequence of the black level correction in the second embodiment.

An explanation will be made by using a flow chart shown in FIG. 10 about the process procedure to perform the black level correction in order to uniformize the black level of the projected image provided by the edge blending multi-projection.

In S201, if the user performs the operation to input the instruction so that the two projectors are to be in the edge blending multi-projection mode by means of the operation unit 112 of each of the projectors or the remote controller, the blend area position selection screen is displayed in S202. The blend area position selection screen is the screen which is provided to designate the blend area position for selecting the position of the blend area between the projected image formed by the subject machine and the projected image formed by the projector disposed adjacently to the subject machine, in the same manner as in the adjoining projector position selection screen shown in FIG. 4B in the first embodiment. The position of the adjoining projector may be previously inputted into the projector 100. Alternatively, when the note PC 700 transmits the screen position information together with the divided image, the position of the adjoining projector may be specified on the basis of the screen position information. That is, if the screen position information indicates "left", such a situation is assumed that the adjoining projector projects the right side of the projected image. Therefore, the position of the adjoining projector may be determined on the basis of the screen position information.

In S203, the user performs the operation to designate the position of the blend area on the blend area position selection screen for each of the projector 100 and the projector 200.

Figure 9C:
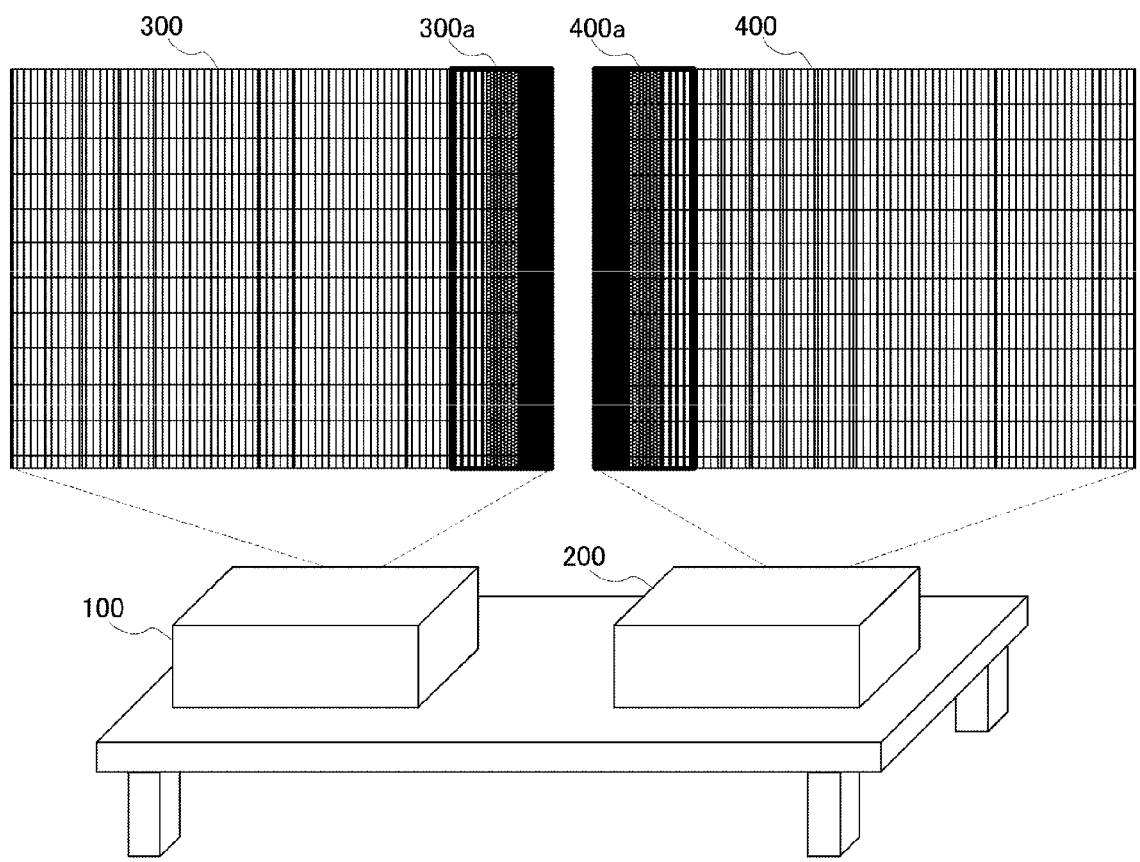

In S204, each of the control units 108 of the projector 100 and the projector 200 is operated to display the edge blending position adjusting image including a grid image as shown in FIG. 9C. The user can adjust the positions of the projectors so that the projected images of the two projectors are precisely overlaid or overlapped with each other in the blend area while viewing the displayed grid image. After performing the position adjustment for the projectors, the user performs the operation to input the instruction of the completion of the position adjustment with respect to each of the projectors by means of the operation unit 112 or the remote controller. When this instruction is received, each of the control units 108 of the projector 100 and the projector 200 erases the edge blending position adjusting image. FIG. 9A shows such a projection state that the two projectors perform the full screen display of the "black" images of the luminance adjustment screens after the completion of the position adjustment. In the example shown in FIG. 9A, the blend area 600, which is provided by the projected image 300 of the projector 100 and the projected image 400 of the projector 200, has a high luminance, because the projected images formed by the two projectors are overlapped or overlaid. Further, the black level of the projector 100 is lower than the black level of the projector 200.

Subsequently, the user performs the black level correction in which the black levels of the projector 100 and the projector 200 are conformed or matched with the black level of the blend area 600. In this embodiment, an example will be explained, in which the black level correction is performed for the projector 200 after performing the black level correction for the projector 100. However, the order or sequence to perform the black level correction is arbitrary.

Figure 11A:
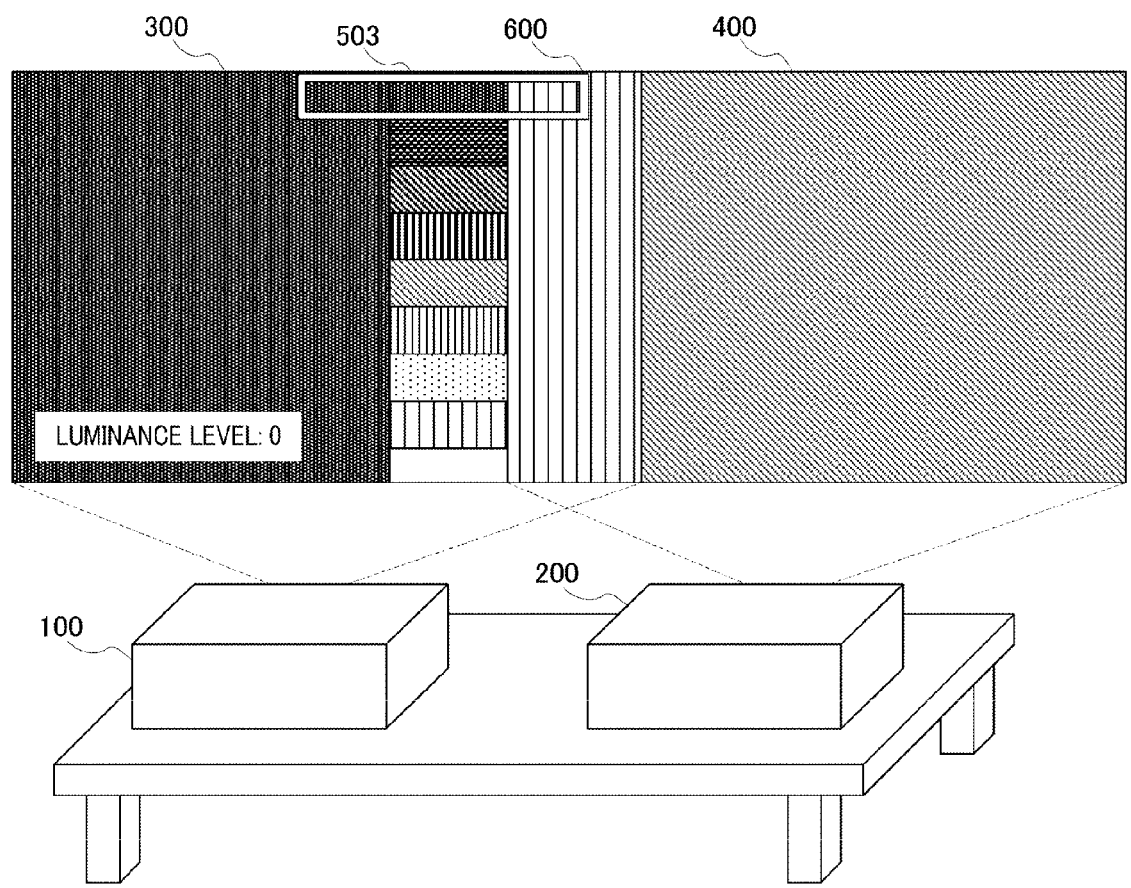
FIG. 11A to 11E show a process of the black level correction for projectors in the second embodiment.
Figure 11B:
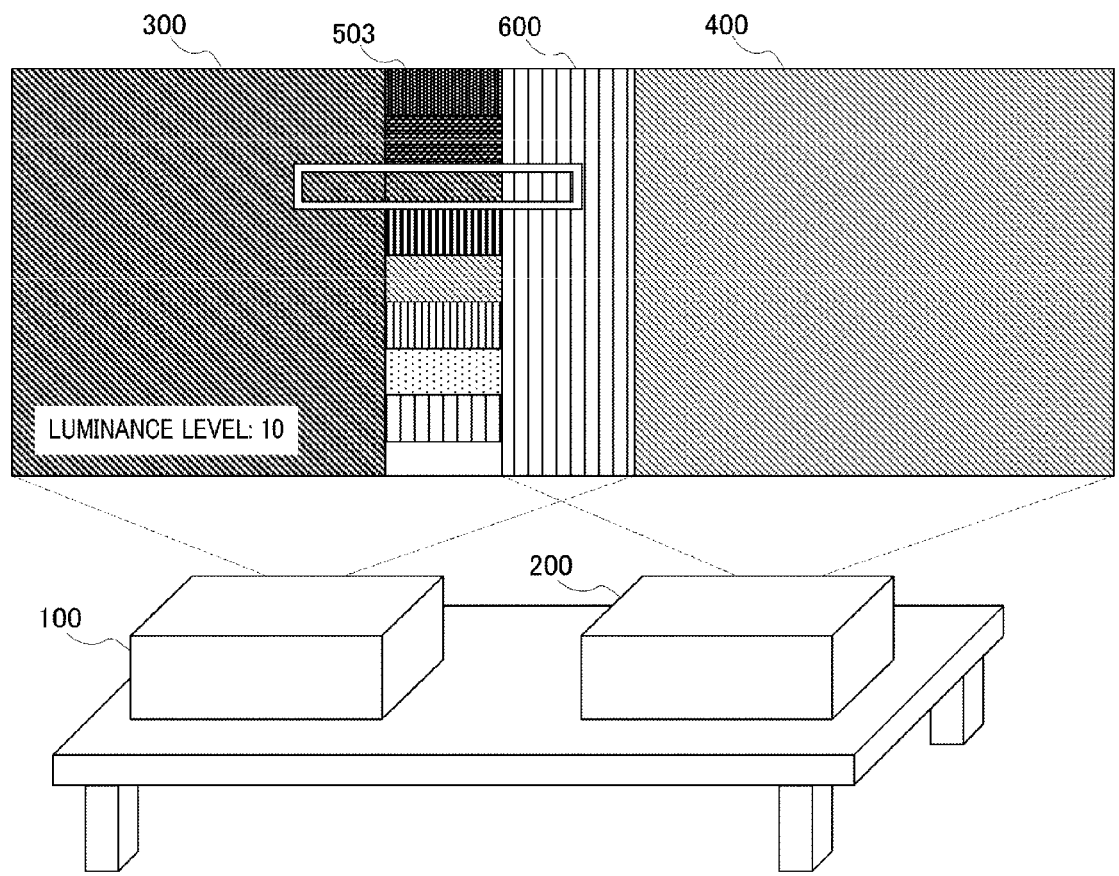
Figure 11C:
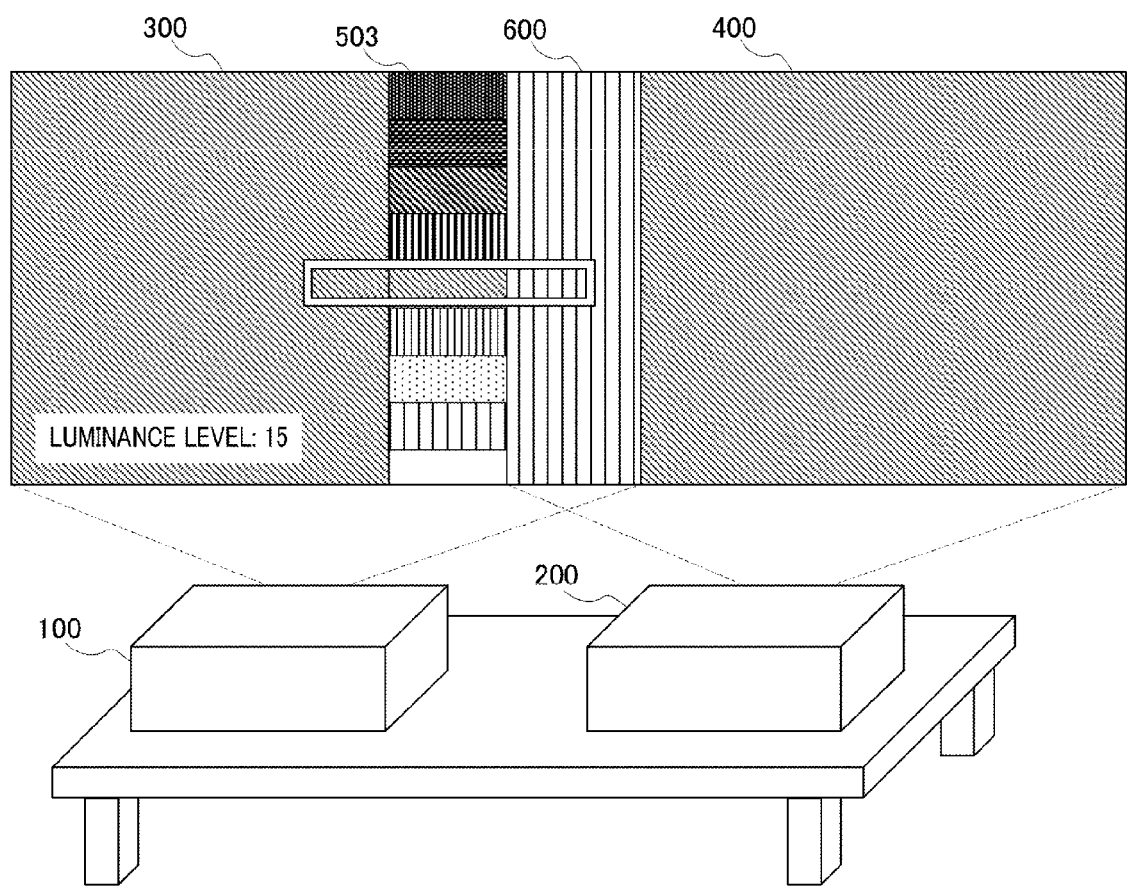
Figure 11D:
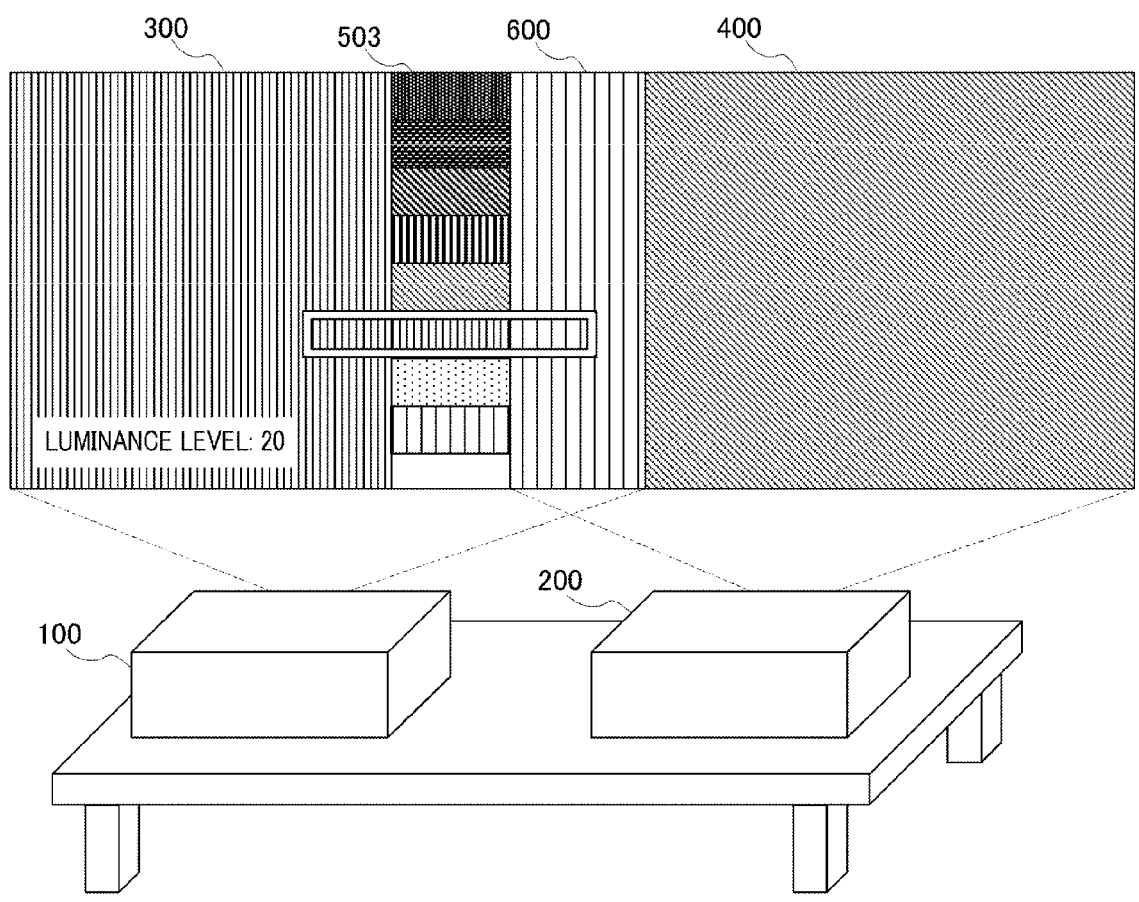

When the user inputs the instruction of the black level correcting process by operating the operation unit 112 of the projector 100 or the remote controller in order to perform the black level correction for the projector 100, the control unit 108 performs the display of the luminance adjustment screen in S205. In this embodiment, a gradation image 503, which is provided as the luminance adjustment screen, is displayed along the side of the blend area 600 disposed on the side of the projected image 300 in a partial area of the display area of the "black" image other than the blend area of the projected image 300 as shown in FIG. 11A. In the gradation image 503, the luminance is gradually changed in the direction parallel to the concerning side. In this embodiment, as shown in FIG. 11A, the lowest luminance of the gradation image is made identical with the lowest luminance of the projected image 300 of the projector 100. Also in this embodiment, the gradation image may be displayed at any position provided that the user can confirm the black image of the adjoining projector at the position. For example, the gradation image may be displayed at a position nearer to the projected image of the adjoining projector as compared with the center of the display screen. That is, the liquid crystal driving unit 105 is controlled so that the gradation image is displayed at the position corresponding to the position of the projected image of the adjoining projector. However, in this embodiment, the gradation image is displayed in the area other than the blend area (overlaid area 600).

In S206, the user views and compares the blend area 600 and the gradation image 503 to adjust the black level of the projected image 300 of the projector 100. The user can perform the adjustment of the black level of the projector 100 as follows. When the user inputs the instruction to change the luminance of the projector 100 by operating the operation unit 112 or the remote controller, the control unit 108 controls the image processing unit 109 so that the luminance of the "black" image is changed for the area of the projected image 300 other than the gradation image 500. As shown in FIGS. 11A to 11E, the text, which indicates the present luminance level, is displayed in a superimposed manner in the display area of the "black" image of the projected image 300. Further, a white frame image is displayed in a superimposed manner on a portion of the gradation image 503 having the same luminance as the luminance of the present "black" image. Therefore, if the user performs the operation for changing the luminance of the projector 100, then the white frame image is moved upwardly/downwardly on the gradation image 500, and the luminance of the "black" image is changed to the same luminance as the luminance of the portion at which the white frame image is present.

Figure 11E:
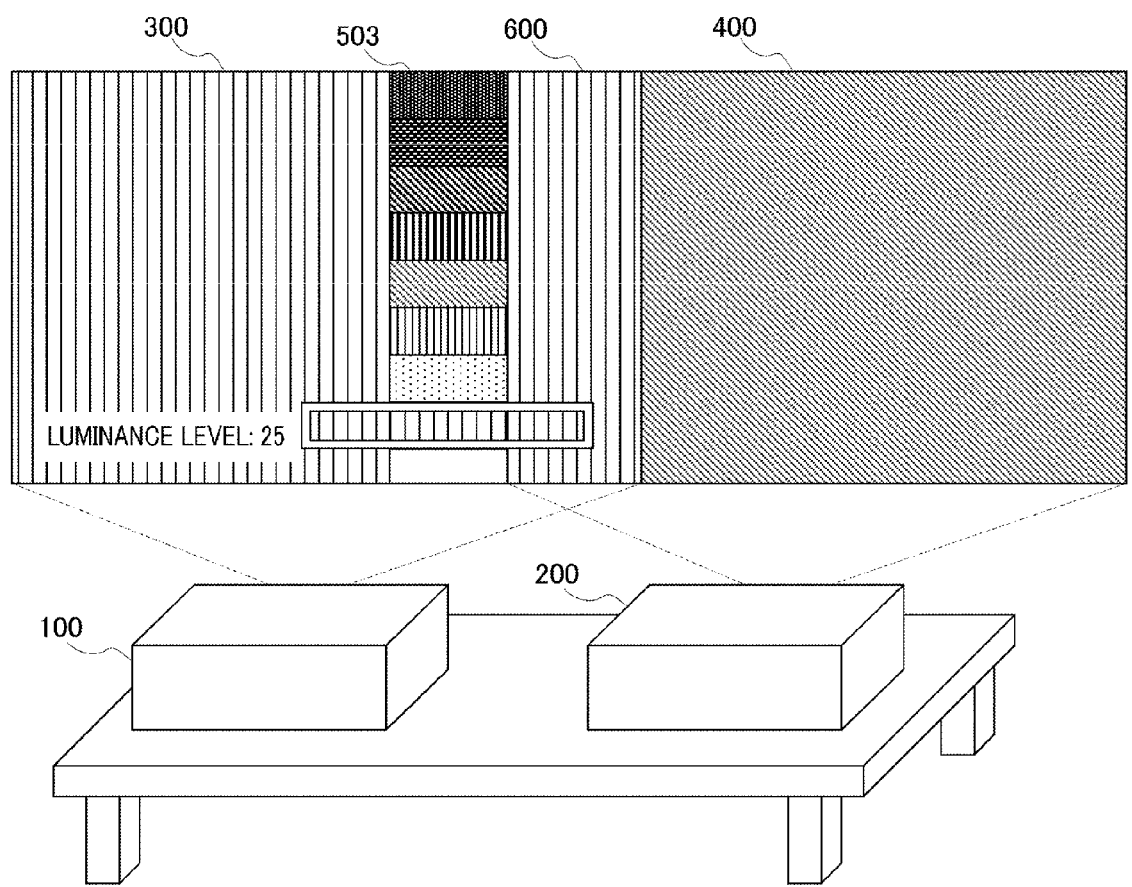
Figure 12:
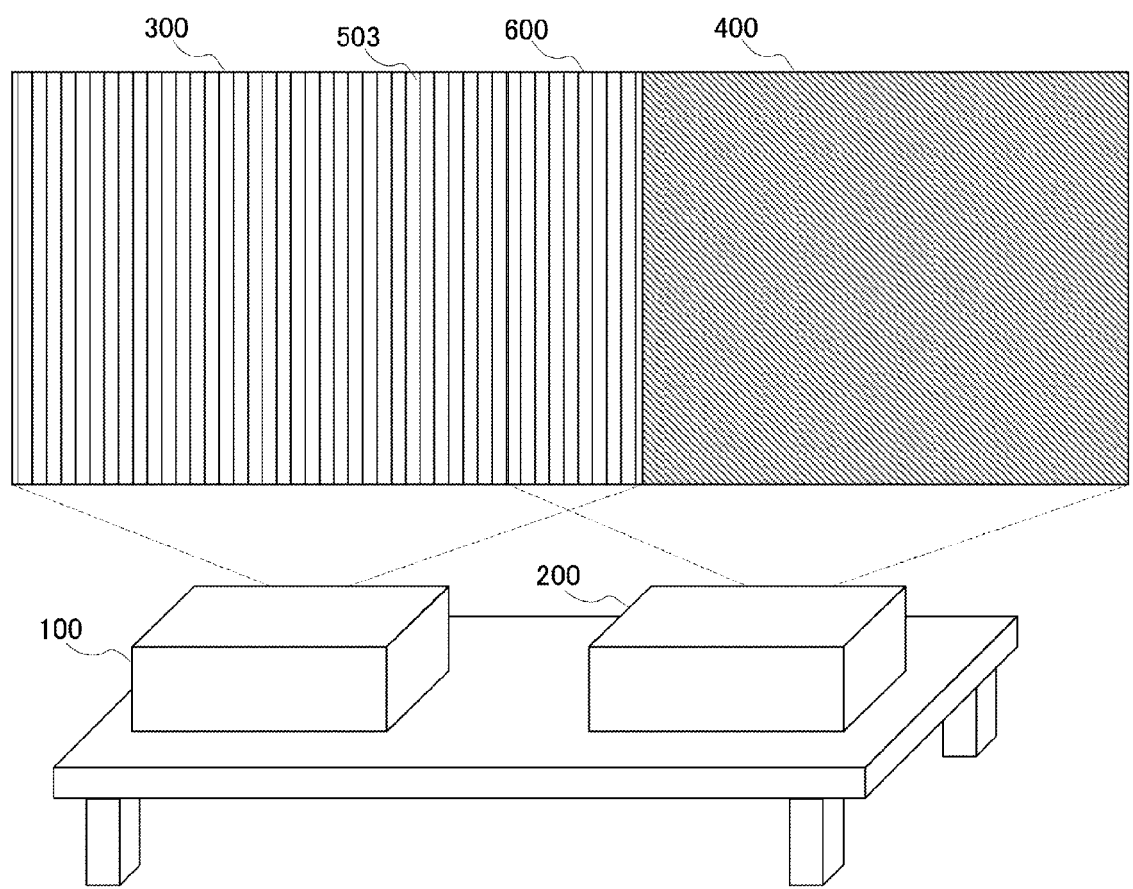
FIG. 12 shows a state after the completion of the black level correction for the projectors in the second embodiment.

The user judges whether or not the luminance of the "black" image of the projected image 300 of the projector 100 is the same as the luminance of the blend area 600, while changing the luminance of the "black" image of the projected image 300 of the projector 100. The operation in S206 is repeated until the former is the same as the latter. FIGS. 11A to 11E show situations in which the luminance level of the "black" image of the projected image 300 is progressively changed to 0, 10, 15, 20, 25 by gradually changing the luminance of the "black" image projected by the projector 100 in the direction directed to the high luminance by the user. For example, if the user judges that the luminance of the "black" image of the projected image 300 is the same as the luminance of the blend area 600 in the state of the luminance level of 25 as shown in FIG. 11E, the user inputs the instruction to determine the corrected value of the black level (Yes in S207). In accordance therewith, the control unit 108 of the projector 100 stores the black level corrected value in ROM 110 (S208). In S209, the display of the gradation image 503 is completed as shown in FIG. 12.

Figure 13A:
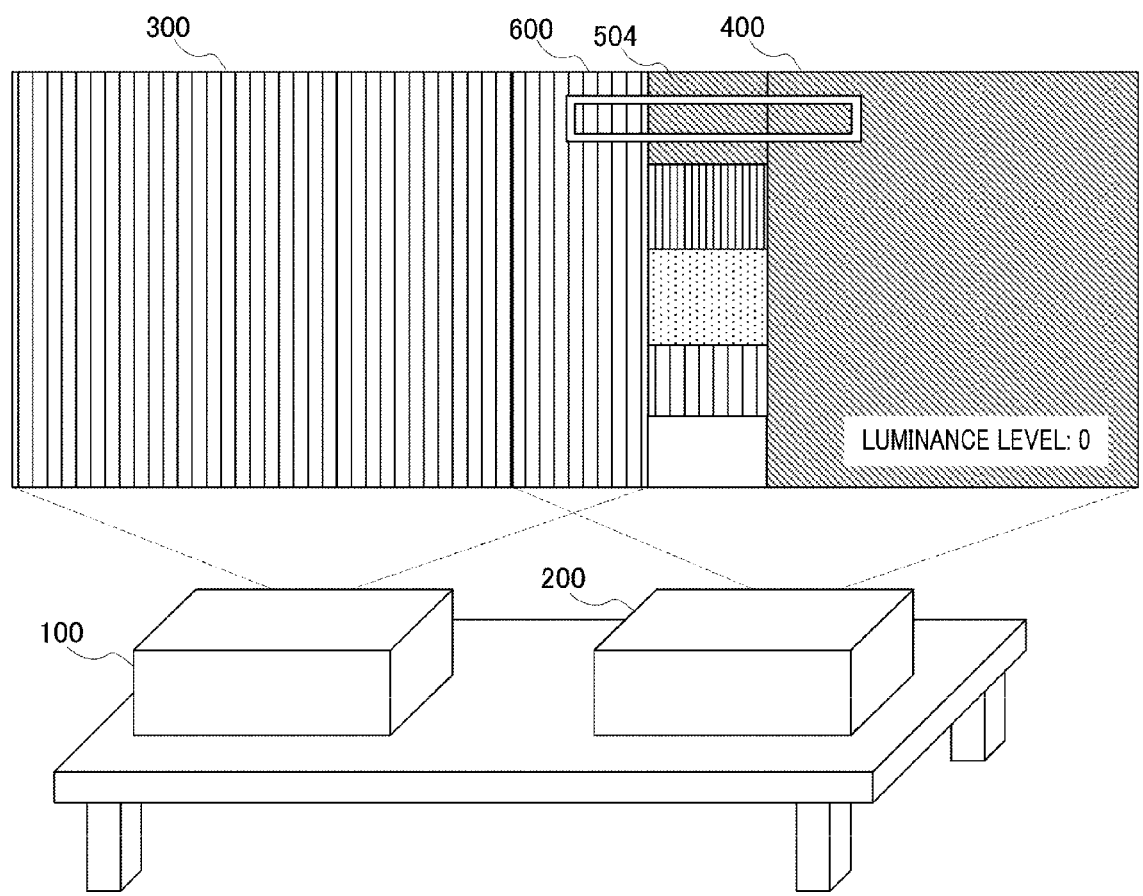
FIG. 13A to 13C show a process of the black level correction for the projectors in the second embodiment.
Figure 13B:
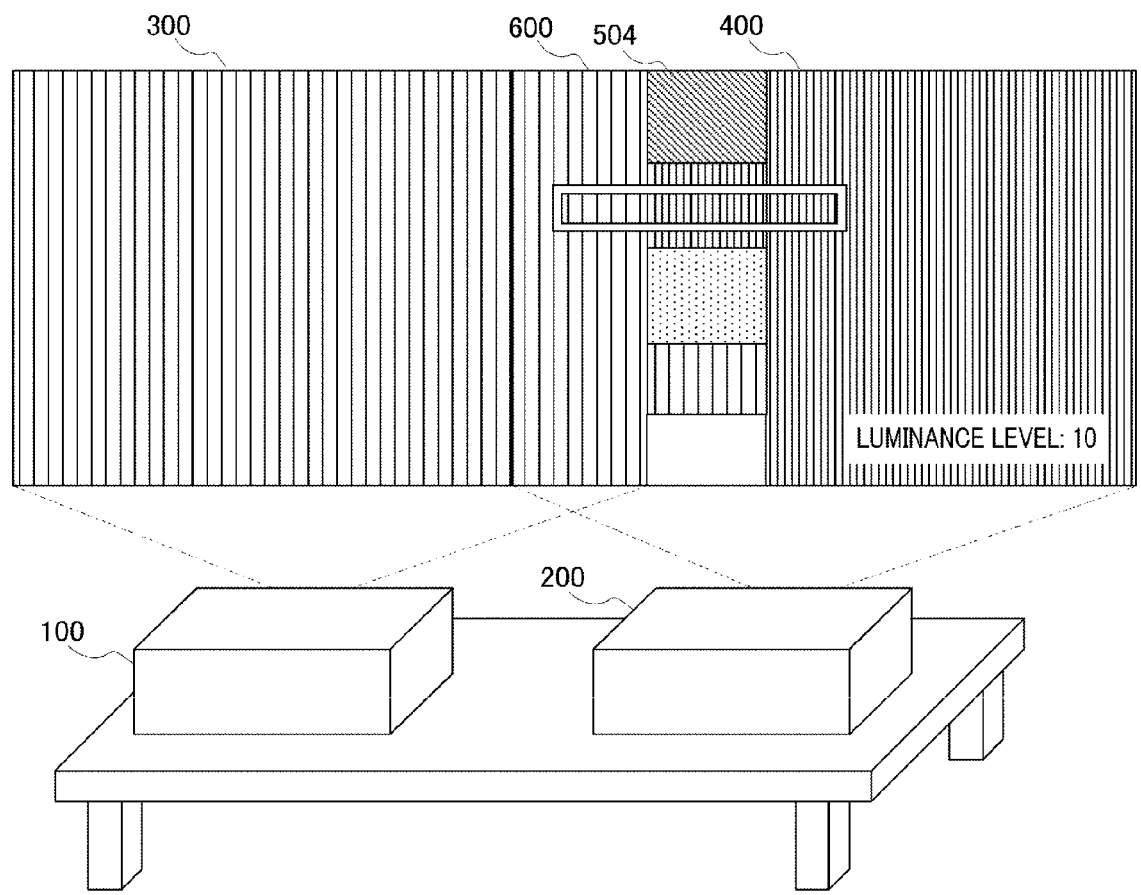
Figure 13C:
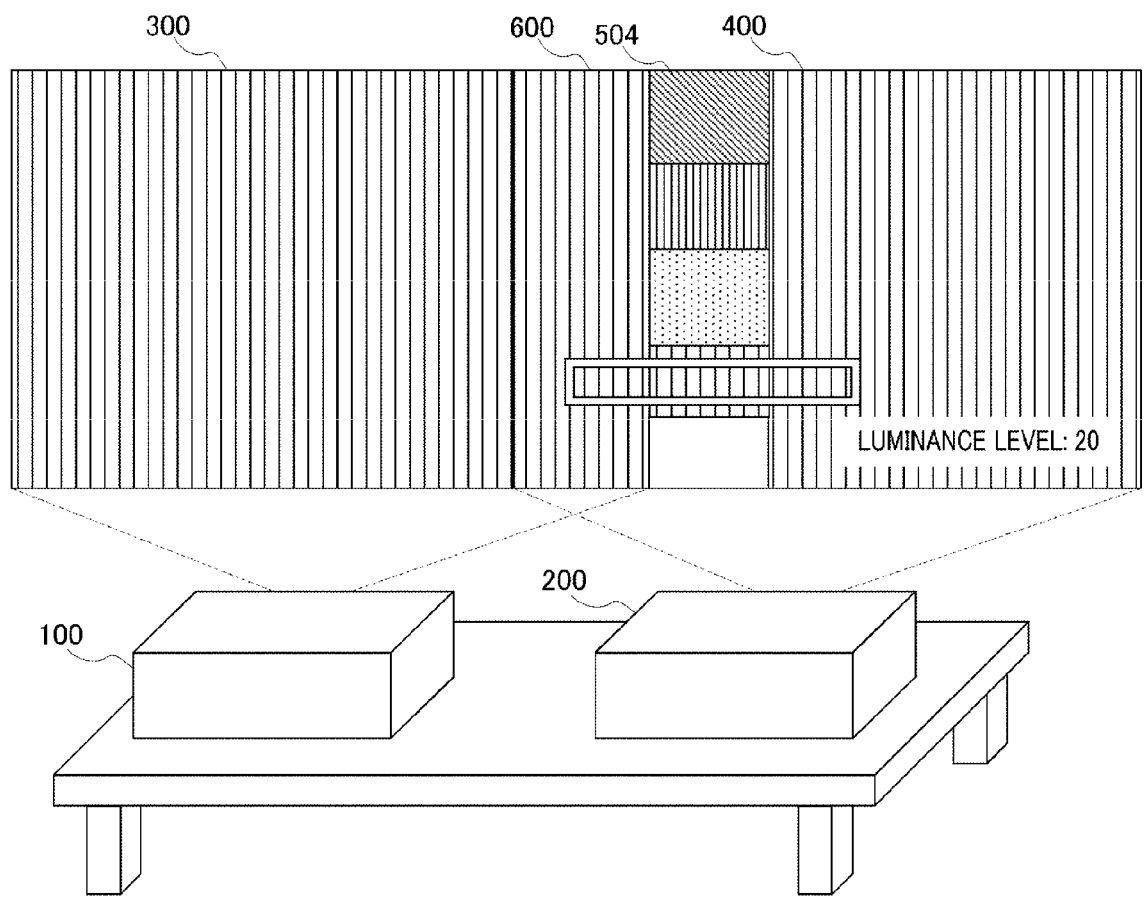
Figure 14:
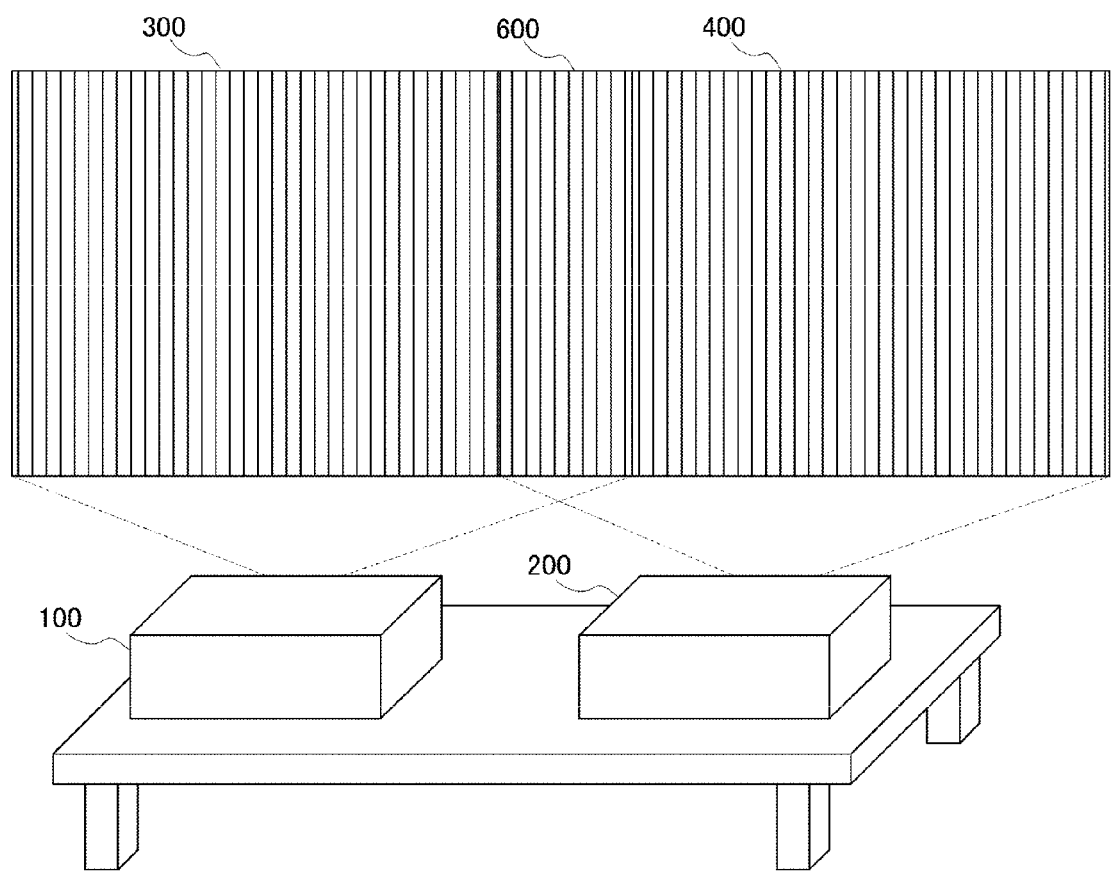
FIG. 14 shows the completion of the black level correction in the second embodiment.

Subsequently, the user operates the projector 200 to perform the correction of the black level of the projected image 400. The process flow is the same as or equivalent to that of the black level correction for the projected image 300 of the projector 100 described above. That is, as shown in FIG. 13A, a gradation image 504, in which the luminance is gradually changed in the direction parallel to the concerning side, is displayed along the side of the blend area 600 disposed on the side of the projected image 400. As shown in FIG. 13A, the lowest luminance of the gradation image 504 is made identical with the lowest luminance of the projected image 400 of the projector 200. The method for correcting the black level is the same as or equivalent to that for the projector 100. The user changes the luminance of the "black" image of the projected image 400 of the projector 200 until the luminance is the same as the luminance of the blend area 600. FIGS. 13A to 13C show situations in which the luminance level of the "black" image of the projected image 400 is progressively changed to 0, 10, 20 by gradually changing the luminance of the "black" image projected by the projector 200 in the direction directed to the high luminance by the user. In FIGS. 13A to 13C, the black level adjustment for the projector 100 has been already completed, and hence the black level of the blend area 600 is the same as the black level of the projected image 300. If the user judges that the luminance of the projected image 400 is the same as the luminance of the blend area 600, the user inputs the instruction to determine the corrected value of the black level of the projector 200 into the projector 200. The projector 200 determines the corrected value of the black level which is stored in ROM 110. According to the process as described above, the black levels of the projectors 100 and 200 are conformed or matched with the black level of the blend area 600. As shown in FIG. 14, the black levels are uniformized in relation to the projected image 300, the blend area 600, and the projected image 400.

Figure 15B:
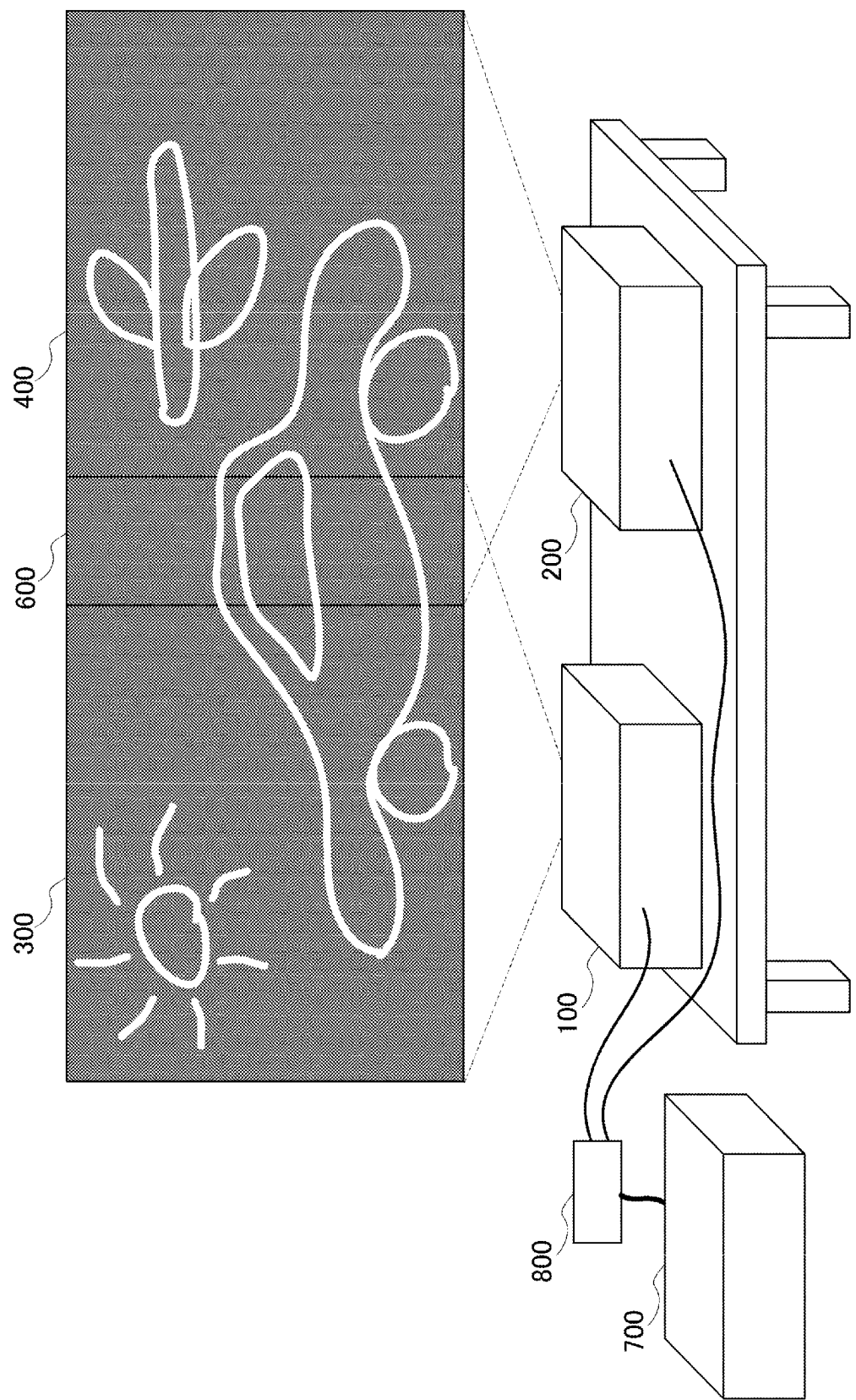

After S209, the projector 100 and the projector 200 perform the image processing on the basis of the black level corrected values determined by the process as described above with respect to the image signal inputted from the note PC 700, and the image, which is based on the image signal after the image processing, is projected. Accordingly, as shown in FIG. 15B, the luminance levels are uniformized in relation to the projected image 300 formed by the projector 100, the blend area 600, and the projected image 400 formed by the projector 200. Thus, it is possible to perform the edge blending multi-projection having the high quality.

As described above, the gradation image is displayed adjacently to the blend area in the black level correction to be performed when the edge blending multi-projection is performed to superimpose the adjoining portions of the projected images of the two projectors. Thus, the user can perform the black level correction easily and precisely. That is, according to this embodiment, the user can easily perform the luminance adjustment in order to uniformize the luminance levels of the respective projected images when the multi-projection is performed while aligning the projected images of a plurality of projection apparatuses.

This embodiment is illustrative of such an exemplary case that the user manually performs the black level correction. However, as shown in a block diagram of FIG. 16A, a camera 114 may be provided to measure the luminance of the projected image. The black level correction may be automatically performed by using the measured value obtained by the camera 114. For example, the following procedure is also available. That is, the luminance of the white frame portion of the gradation image and the luminance of the blend area are acquired by the camera 114, and the values thereof are compared with each other. Thus, the luminance of the gradation image, which is the same as the luminance of the blend area, is judged.

Figure 16B:
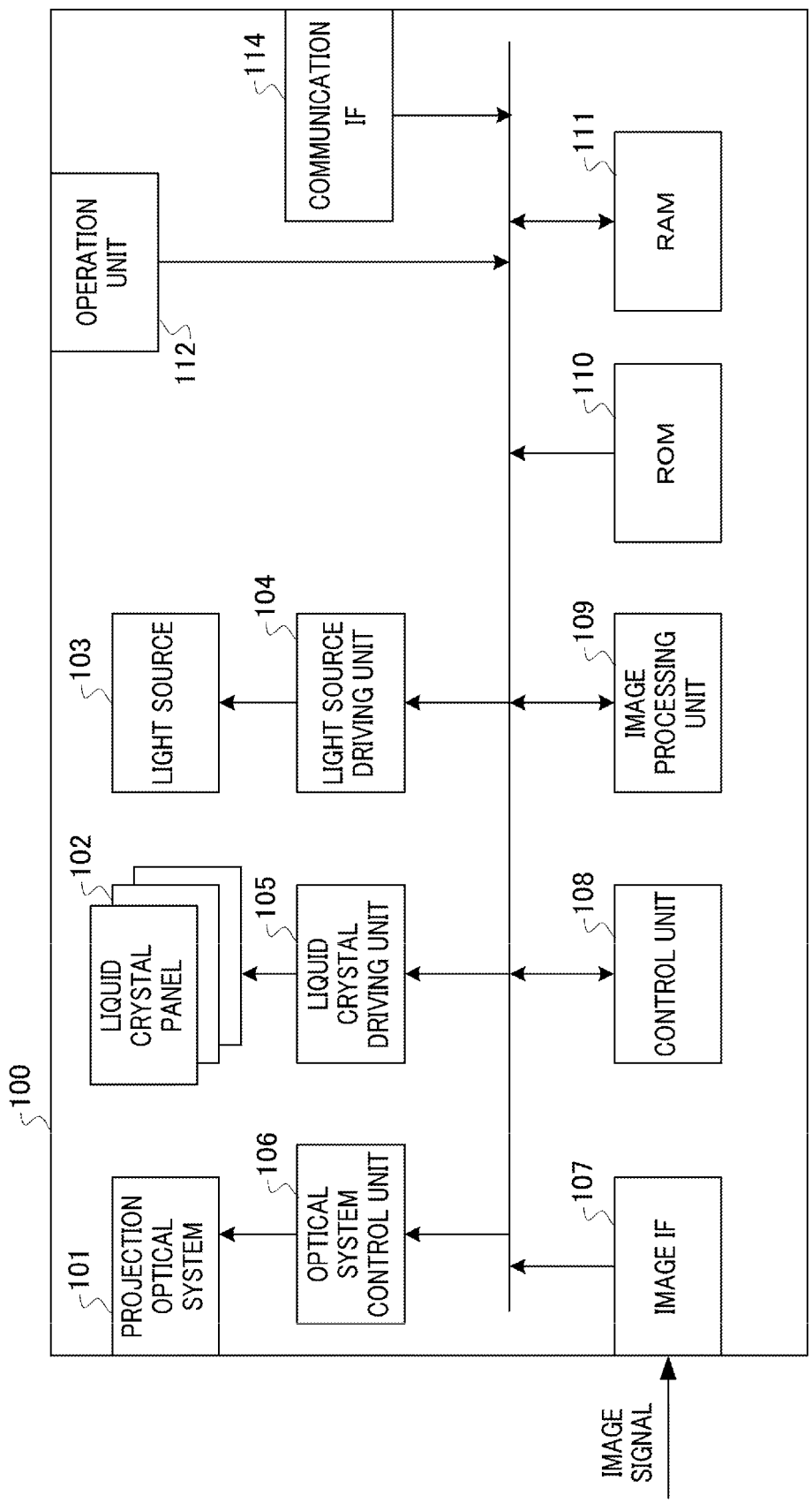

In this embodiment, the lowest luminance of each of the projectors is the luminance of the darkest portion of the gradation image. However, the luminance of the blend area may be automatically measured by providing the camera 114 as shown by the construction in FIG. 16A, and the luminance may be used as the luminance of the darkest portion of the gradation image. Alternatively, as shown by the construction in FIG. 16B, a communication IF 113 may be provided, and the black levels may be communicated among a plurality of projectors. The luminance of the blend area, which is estimated by adding up the black levels, may be used as the luminance of the darkest portion of the gradation image. The information to be communicated may be, for example, the information of the transmittance which is given to the liquid crystal driving unit with respect to the input of the lowest gradation value by the image processing unit.

Preferred embodiments of the present invention have been explained above. However, the present invention is not limited to these embodiments, and the present invention can be variously modified or changed within the scope of the gist or essential characteristics thereof.

In the respective embodiments described above, the explanation has been made as exemplified by the black level correction byway of example. However, the present invention is not limited to the correction of the black level. The present invention is applicable to such a correcting process that the luminances corresponding to various colors and gradation values are uniformized among a plurality of projection apparatuses. In such a procedure, the correcting process as described above may be executed in a state in which the subject machine and the other projection apparatuses simultaneously project single color images having predetermined gradation values as the correction objectives in place of the "black" image referred to in the foregoing embodiment. In this procedure, the luminance adjusting screen may be such an image that the gradation image, which has the same color as that of the single color image, is displayed in a superimposed manner in a partial area of the display area of the projected image of the subject machine as the adjustment image for adjusting the color or the luminance. The gradation image is an example of the image to indicate the degree of adjustment on the adjustment image in accordance with the degree of adjustment of the color or the luminance.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-035074, filed on Feb. 21, 2012, which is hereby incorporated by reference herein in its entirety.

What is claimed is:

1. A display system for displaying one image on a display surface by superimposing a part of a first image displayed by a first display apparatus and a part of a second image displayed by a second display apparatus thereby combining the first image and the second image, wherein:
the first display apparatus and the second display apparatus are projection apparatuses;
the first display apparatus displays a first index image at a position which is close to the image displayed by the second display apparatus in an area which is included in a display range of the first display apparatus and which is not superimposed with the image displayed by the second display apparatus, the first index image having a predetermined color and the image having luminances which are changed in a direction parallel to a side adjacent to the image displayed by the second display apparatus; and
the first display apparatus corrects the image displayed by the first display apparatus on the basis of a designated position of the first index image.

2. The display system according to claim 1, wherein the second display apparatus displays the image having a lowest luminance of the predetermined color when the first display apparatus displays the first index image.

3. The display system according to claim 1, wherein the first display apparatus displays the image having the predetermined color in an area other than the first index image at the luminance corresponding to the designated position of the first index image.

4. The display system according to claim 1, wherein:
the second display apparatus displays a second index image at a position which is close to the image displayed by the first display apparatus and which is included in a display range of the second display apparatus, the second index image having a predetermined color and the image having luminances which are changed in a direction parallel to a side adjacent to the image displayed by the first display apparatus; and
the second display apparatus corrects the image displayed by the second display apparatus on the basis of a designated position of the second index image.

5. The display system according to claim 1, wherein the first display apparatus corrects the image displayed by the first display apparatus so that the luminance, which corresponds to the designated position of the first index image, is a lowest luminance of the image having the predetermined color.

6. The display system according to claim 4, wherein the second display apparatus corrects the image displayed by the second display apparatus so that the luminance, which corresponds to the designated position of the second index image, is a lowest luminance of the image having the predetermined color.

7. The display system according to claim 4, wherein the second display apparatus displays the second index image at a position close to the image displayed by the first display apparatus in an area which is not superimposed with the image displayed by the first display apparatus.

8. A first display apparatus for displaying one image composed of a first image and a second image on a display surface by projecting the first image onto a position adjacent to the second image projected by a second display apparatus, the first display apparatus comprising:
a display unit which displays the image on the display surface; and
a receiving unit which receives the image to be displayed on the display surface, wherein:
the first display apparatus and the second display apparatus are projection apparatuses;
the display unit displays the image by superimposing a part of the image displayed by the second display apparatus and a part of the image displayed by the display unit;
the display unit displays a first index image at a position which is close to the image displayed by the second display apparatus in an area which is included in a display range of the display unit and which is not superimposed with the image displayed by the second display apparatus, the first index image having a predetermined color and the image having luminances which are changed in a direction parallel to a side adjacent to the image displayed by the second display apparatus; and
the display unit corrects the image received by the receiving unit on the basis of a designated position of the first index image.

9. The first display apparatus according to claim 8, wherein the display unit displays the image having the predetermined color in an area other than the first index image at the luminance corresponding to the designated position of the first index image.

10. The first display apparatus according to claim 8, wherein the display unit corrects the image received by the receiving unit so that the luminance, which corresponds to the designated position of the first index image, is a lowest luminance of the image having the predetermined color.

11. A method for controlling a display system for displaying one image on a display surface by superimposing a part of a first image displayed by a first display apparatus and a part of a second image displayed by a second display apparatus thereby combining the first image and the second image, wherein the first display apparatus and the second display apparatus are projection apparatuses, the method comprising:
   controlling the first display apparatus so that a first index image is displayed at a position which is close to the image displayed by the second display apparatus in an area which is included in a display range of the first display apparatus and which is not superimposed with the image displayed by the second display apparatus, the first index image having a predetermined color and the image having luminances which are changed in a direction parallel to a side adjacent to the image displayed by the second display apparatus; and
   controlling the first display apparatus so that the image displayed by the first display apparatus is corrected on the basis of a designated position of the first index image.

12. A method for controlling a first display apparatus for displaying one image composed of a first image and a second image on a display surface by projecting the first image onto a position adjacent to the second image projected by a second display apparatus, wherein the first display apparatus and the second display apparatus are projection apparatuses, the method comprising:
   receiving the image to be displayed on the display surface;
   displaying the one image by superimposing a part of the image displayed by the second display apparatus and a part of the image displayed by the first display apparatus;
   displaying a first index image at a position which is close to the image displayed by the second display apparatus in an area which is included in a display range of the first display apparatus and which is not superimposed with the image displayed by the second display apparatus, the first index image having a predetermined color and the image having luminances which are changed in a direction parallel to a side adjacent to the image displayed by the second display apparatus; and
   correcting the image received by the receiving step on the basis of a designated position of the first index image.

13. The method for controlling the first display apparatus according to claim 12 further comprising:
   displaying an image having the predetermined color in an area other than the first index image at the luminance corresponding to the designated position of the first index image.

14. The method for controlling the first display apparatus according to claim 12, wherein
   in the correcting step, the image received in the receiving step is corrected so that the luminance, which corresponds to the designated position of the first index image, is a lowest luminance of the image having the predetermined color.

* * * * *